United States Patent
Kim et al.

(10) Patent No.: US 12,432,531 B2
(45) Date of Patent: Sep. 30, 2025

(54) ELECTRONIC DEVICE AND SERVER PROVIDING PUSH-TO-TALK SERVICE AND METHOD FOR OPERATING THE SAME

(71) Applicant: Samsung Electronics Co., Ltd., Suwon-si (KR)

(72) Inventors: Killyeon Kim, Suwon-si (KR); Yunsun Baek, Suwon-si (KR); Jihyun Yoon, Suwon-si (KR); Jungdo Lee, Suwon-si (KR); Munhwan Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 581 days.

(21) Appl. No.: 17/749,755

(22) Filed: May 20, 2022

(65) Prior Publication Data
US 2023/0076586 A1    Mar. 9, 2023

Related U.S. Application Data

(63) Continuation of application No. PCT/KR2022/006529, filed on May 9, 2022.

(30) Foreign Application Priority Data

Aug. 24, 2021 (KR) .................. 10-2021-0111890

(51) Int. Cl.
*H04W 4/10* (2009.01)
*H04L 65/1045* (2022.01)
*H04L 65/403* (2022.01)

(52) U.S. Cl.
CPC ........... *H04W 4/10* (2013.01); *H04L 65/1045* (2022.05); *H04L 65/4046* (2013.01)

(58) Field of Classification Search
CPC ....................................... H04W 4/10
See application file for complete search history.

(56) References Cited

U.S. PATENT DOCUMENTS 7,536,191 B2    5/2009    Luo et al.
7,983,707 B2    7/2011    Hardin
(Continued)

FOREIGN PATENT DOCUMENTS

CN    100592831 C  *  2/2010
EP    3 254 484 B1    4/2021
(Continued)

OTHER PUBLICATIONS

International Search Report and Written Opinion dated Aug. 8, 2022, issued in International Patent Application No. PCT/KR2022/006529.

(Continued)

*Primary Examiner* — Gennadiy Tsvey
(74) *Attorney, Agent, or Firm* — Jefferson IP Law, LLP

(57) ABSTRACT

According to various embodiments, an electronic device comprising a processor, a communication module circuitry operatively connected to the processor, and an output device operatively connected to the processor may be provided. The processor may be configured to activate a first channel for providing a push-to-talk (PTT) service and deactivate a second channel for providing the PTT service in a state in which the first channel and the second channel are generated, transmit a first message associated with the first channel including information indicating that the first channel is activated, through the communication module circuitry to a PTT server configured to provide the PTT service, transmit a second message associated with the second channel including information indicating that the channel is deactivated, through the communication module circuitry to the PTT server, output first media data associated with the first channel using first part of the output device.

16 Claims, 13 Drawing Sheets

(56) References Cited

U.S. PATENT DOCUMENTS

| | | | |
|---|---|---|---|
| 2004/0187109 A1* | 9/2004 | Ross | H04W 76/45 |
| | | | 718/100 |
| 2005/0105511 A1 | 5/2005 | Poikselka | |
| 2007/0218932 A1* | 9/2007 | Sung | H04L 65/4061 |
| | | | 455/518 |
| 2007/0254606 A1 | 11/2007 | Dunko | |
| 2008/0081604 A1* | 4/2008 | Sung | H04L 65/1104 |
| | | | 455/422.1 |
| 2008/0285532 A1 | 11/2008 | Gentric | |
| 2010/0190478 A1* | 7/2010 | Brewer | H04W 76/45 |
| | | | 455/414.1 |
| 2010/0325289 A1* | 12/2010 | Dostal | H04W 76/45 |
| | | | 709/227 |
| 2013/0109425 A1 | 5/2013 | Kerger et al. | |
| 2014/0282094 A1 | 9/2014 | Levine | |
| 2016/0226937 A1 | 8/2016 | Patel et al. | |
| 2017/0099325 A1 | 4/2017 | Steiner et al. | |
| 2018/0310140 A1 | 10/2018 | Akesson et al. | |
| 2018/0317056 A1* | 11/2018 | Jang | H04W 88/022 |
| 2018/0338026 A1* | 11/2018 | Jon | H04M 1/72469 |
| 2019/0191280 A1* | 6/2019 | Ko | H04W 4/10 |
| 2020/0379617 A1* | 12/2020 | Chang | H04M 1/56 |
| 2021/0392470 A1* | 12/2021 | Sangameshwara | H04W 4/10 |
| 2022/0014569 A1* | 1/2022 | Yang | H04L 65/80 |

FOREIGN PATENT DOCUMENTS

| | | |
|---|---|---|
| KR | 10-2015-0112571 A | 10/2015 |
| KR | 10-2017-0050614 A | 5/2017 |
| WO | 2005/060501 A2 | 7/2005 |
| WO | 2007/098331 A1 | 8/2007 |
| WO | 2019/212316 A1 | 11/2019 |

OTHER PUBLICATIONS

European Search Report dated Sep. 23, 2024, issued in European Application No. 22861505.0.

* cited by examiner

ELECTRONIC DEVICE AND SERVER PROVIDING PUSH-TO-TALK SERVICE AND METHOD FOR OPERATING THE SAME

CROSS-REFERENCE TO RELATED APPLICATION(S)

This application is a continuation application, claiming priority under § 365(c), of an International application No. PCT/KR2022/006529, filed on May 9, 2022, which is based on and claims the benefit of a Korean patent application number 10-2021-0111890, filed on Aug. 24, 2021, in the Korean Intellectual Property Office, the disclosure of which is incorporated by reference herein in its entirety.

TECHNICAL FIELD

The disclosure relates to an electronic device and a server providing a push-to-talk (PTT) service, and an operation for operating the same.

BACKGROUND ART

A push-to-talk (PTT) service (e.g., "walkie-talkie") may be a service that provides transmission/reception of media data between one-to-one or one-to-many users. The user may also be named a client. For example, when media data (e.g., audio data) is transmitted from a device providing a PTT service, the media data may be transmitted to at least one external device included in a corresponding channel. Accordingly, when one user issues an utterance through the device providing the PTT service, other users participating in the channel may substantially simultaneously listen to the utterance. The device providing the PTT service may provide a plurality of channels.

For example, when the device provides the plurality of channels, media data (e.g., audio data) may be received at least simultaneously through each of the plurality of channels. If the device simultaneously reproduces at least simultaneously received media data, it is difficult to identify which channel the voice has been generated from, as well as the content of the voice. For example, the device may at least simultaneously receive the media data respectively corresponding to the plurality of channels and reproduce only media data corresponding to any one channel while discarding or sequentially reproducing the remaining media data. However, as the PTT service requires being real-time, it is not preferable to later reproduce media data received in the past.

The above information is presented as background information only to assist with an understanding of the disclosure. No determination has been made, and no assertion is made, as to whether any of the above might be applicable as prior art with regard to the disclosure.

DISCLOSURE

Technical Problem

As described above, upon at least simultaneously receiving a plurality of media data respectively corresponding to a plurality of channels, a push-to-talk (PTT) service-providing device may reproduce only media data of a specific channel while discarding the remaining media data. However, mobile devices, such as smartphones or wearable devices (e.g., smart watches), include a relatively small battery and have relatively small resources for data processing. Power and/or resources may be consumed for receiving media data that is supposed to be discarded without being reproduced, which may shorten the usage time and/or performance degradation of the mobile device.

Aspects of the disclosure are to address at least the above-mentioned problems and/or disadvantages and to provide at least the advantages described below. Accordingly, aspects of the disclosure are to provide an electronic device and method for operating the same that provides a server with information about whether to activate each of a plurality of channels. According to various embodiments, a server and method for operating the same may refrain from transmitting, to an electronic device, media data corresponding to a deactivated channel, based on receiving, from the electronic device, information about whether to activate each of a plurality of channels.

Technical Solution

In accordance with aspects of the disclosure, an electronic device is provided. The electronic device may comprise at least one processor, at least one communication module circuitry operatively connected to the at least one processor, and at least one output device operatively connected to the at least one processor. The at least one processor may be configured to activate a first channel for providing a push-to-talk (PTT) service and deactivate a second channel for providing the PTT service in a state in which the first channel and the second channel are generated, transmit a first message associated with the first channel including information indicating that the first channel is activated, through the at least one communication module circuitry to a PTT server configured to provide the PTT service, transmit a second message associated with the second channel including information indicating that the second channel is deactivated, through the at least one communication module circuitry to the PTT server, output first media data associated with the first channel using first part of the at least one output device, based on reception of the first media data associated with the first channel through the at least one communication module circuitry, and output a notification indicating that second media data associated with the second channel is generated using second part of the at least one output device, based on reception of a floor taken message associated with the second channel through the at least one communication module circuitry.

In accordance with aspects of the disclosure, a server for providing a push-to-talk (PTT) service may comprise at least one processor and at least one communication module circuitry. The at least one processor may be configured to receive a first message associated with a first channel for providing the PTT service, including information indicating that the first channel is activated, from a first electronic device associated with the first channel and a second channel for providing the PTT service, through the at least one communication module circuitry, receiving a second message associated with the second channel including information indicating that the second channel is deactivated from the first electronic device through the at least one communication module circuitry, receive a floor request message for the second channel from the second electronic device associated with the second channel through the at least one communication module circuitry, transmit a floor grant message corresponding to the floor request message to the second electronic device through the at least one communication module circuitry, transmit a floor taken message corresponding to the floor request message to the first electronic device through the at least one communication module circuitry, and refrain from transmitting, to the first electronic device media data received from the second electronic device based on deactivating the second channel by the first electronic device.

In accordance with aspects of the disclosure, a method for operating a server to provide a push-to-talk (PTT) service is provided. The method may comprise receiving a first message associated with a first channel for providing the PTT service, including information indicating that the first channel is activated, from a first electronic device associated with the first channel and a second channel for providing the PTT service, receiving a second message associated with the second channel including information indicating that the second channel is deactivated, from the first electronic device, receiving a floor request message for the second channel, from a second electronic device associated with the second channel, transmitting a floor grant message corresponding to the floor request message, to the second electronic device, transmitting a floor taken message corresponding to the floor request message, to the first electronic device, and refraining from transmitting media data received from the second electronic device to the first electronic device, based on deactivating the second channel by the first electronic device.

In accordance with aspects of the disclosure, a method for operating an electronic device is provided. The method may comprise activating a first channel for providing a push-to-talk (PTT) service and deactivating a second channel for providing the PTT service in a state in which the first channel and the second channel are generated, transmitting a first message associated with the first channel including information indicating that the first channel is activated to a PTT server configured to provide the PTT service, transmitting a second message associated with the second channel including information indicating that the second channel is deactivated, to the PTT server, outputting first media data associated with the first channel using first part of at least one output device, based on reception of the first media data associated with the first channel, and outputting a notification indicating that second media data associated with the second channel is generated using second part of the at least one output device, based on reception of a floor taken message associated with the second channel.

Advantageous Effects

According to various embodiments, an electronic device capable of providing a server with information about whether to activate each of a plurality of channels and a method for operating the same may be provided. According to various embodiments, a server capable of refraining from transmitting media data corresponding to a deactivated channel to an electronic device, based on receiving, from the electronic device, information about whether to activate each of a plurality of channels and a method for operating the same may be provided. Accordingly, it is possible to prevent transmission of media data corresponding to a deactivated channel, saving power and/or resources.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
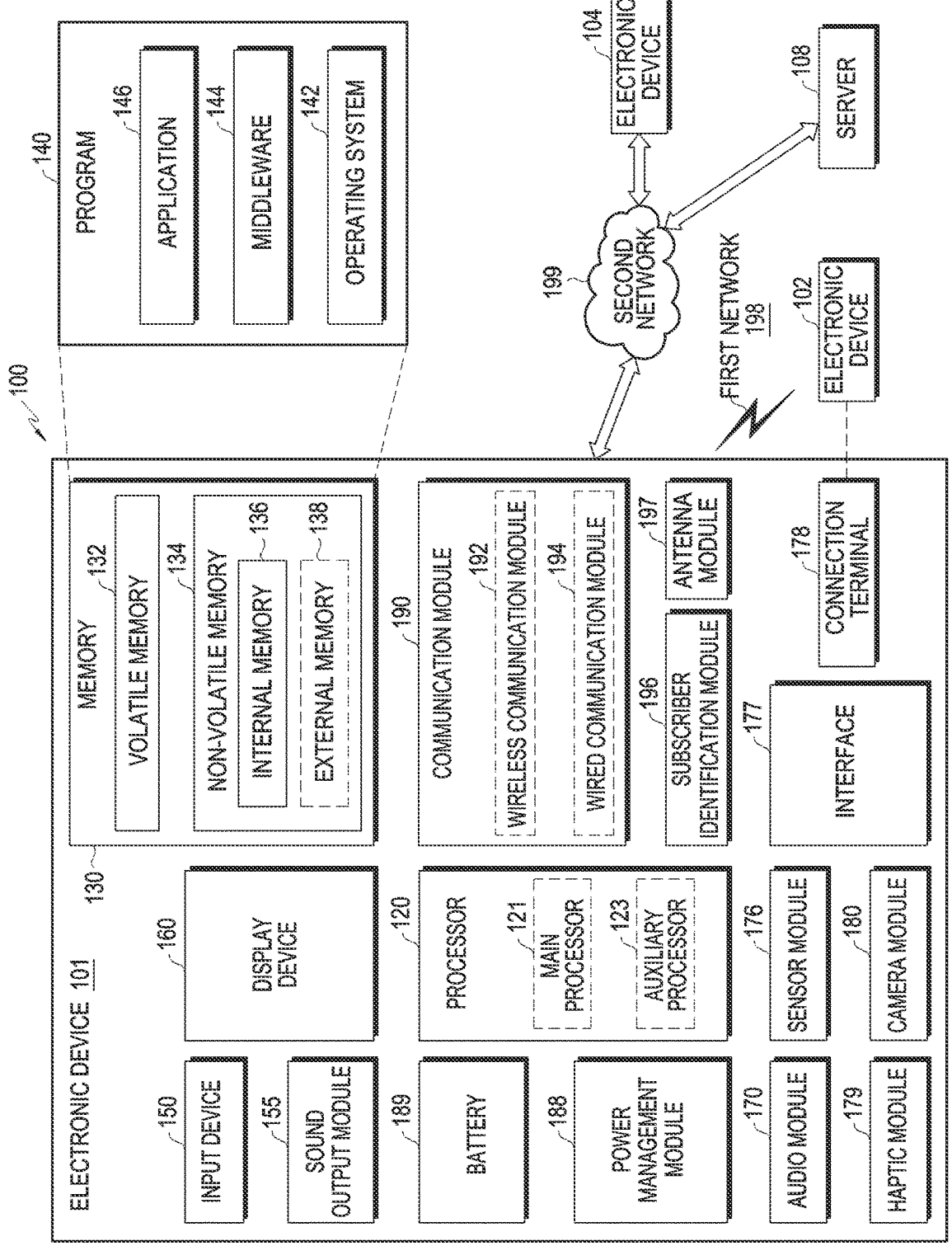
FIG. 1A is a view illustrating an electronic device in a network environment according to various embodiments of the disclosure.

FIG. 1A is a block diagram illustrating an electronic device 101 in a network environment 100 according to various embodiments of the disclosure. Referring to FIG. 1A, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™ wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 1B:
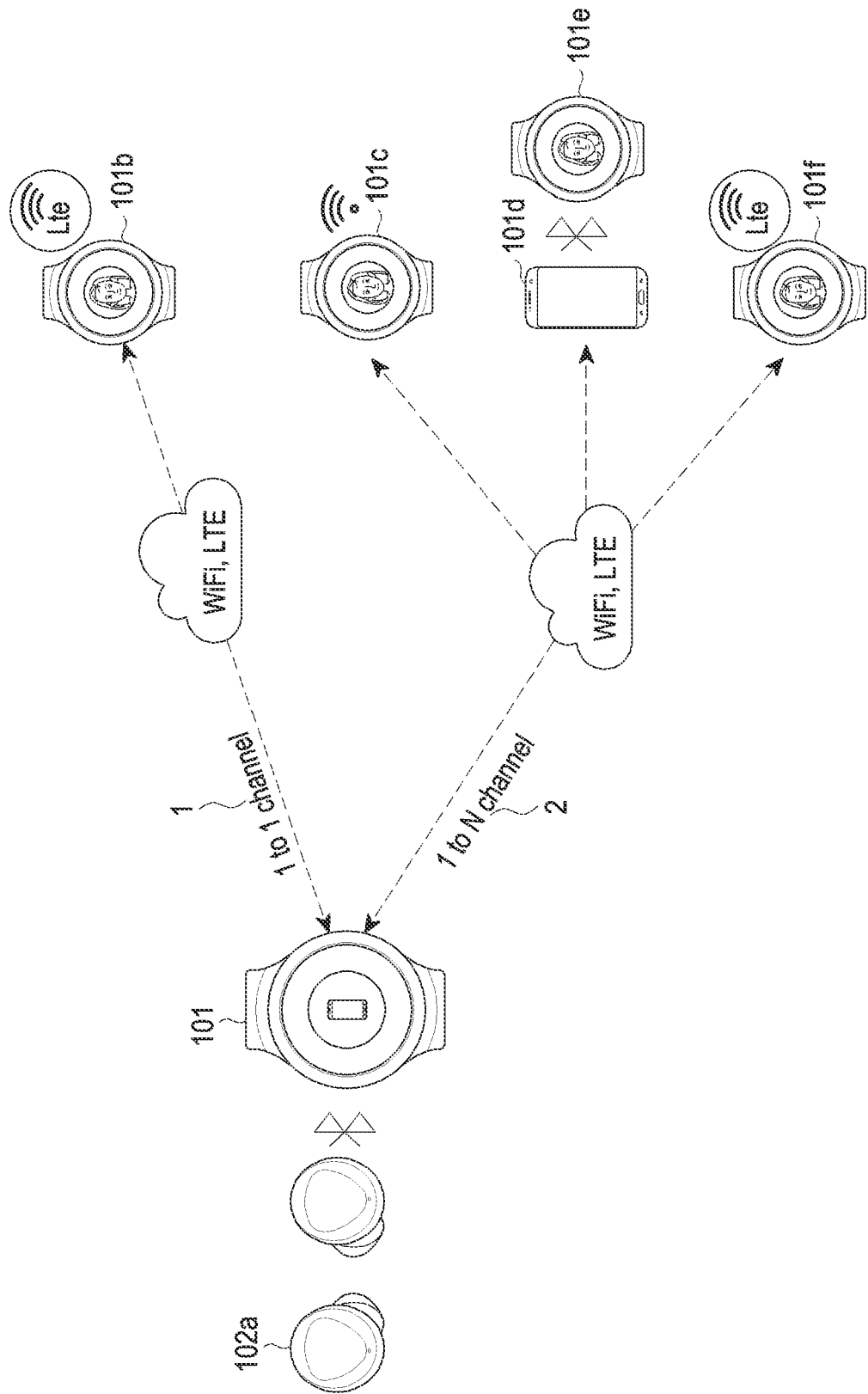
FIG. 1B is a view illustrating a channel generated in an electronic device according to various embodiments of the disclosure.

FIG. 1B is a view illustrating a channel generated in an electronic device according to various embodiments of the disclosure.

According to various embodiments, an electronic device 101 may generate a first channel 1 with a first external device 101b. Here, the channel may refer to a set of at least one user (or also referred to as a client, or a member) that may transmit and/or receive media data to/from each other, and the channel may also be referred to as a group. Users participating in the channel may be managed based on user identification information. For example, the user identification information may be different from identification information about the electronic device 101. In one example, the user identification information may be generated based on a mobile station international subscriber directory number (MSIDSN) and/or a globally unique identifier (GUID). In one example, internet protocol (IP) multimedia public identity (IMPU), which is user identification information, may be a hash value using a GUID as a salt in the MSIDSN, but this is exemplary and types and/or generation methods of user identification information are not limited. For example, the management information about the first channel 1 stored by the electronic device 101 and/or the PTT server providing the PTT service may include identification information (e.g., a first IMPU) about a first user corresponding to the electronic device 101 and identification information (e.g., a second IMPU) about a second user corresponding to the first external device 101b.

In one example, the electronic device 101 may transmit a message (e.g., an invite request message) to invite the second user corresponding to the first external device 101b to the channel. For convenience of description, this may be represented as the electronic device 101 inviting the first external device 101b to the channel. For example, the electronic device 101 may provide (e.g., display on screen and/or output in voice) information about at least one other user that may be invited to the channel and a user interface for selection from among them. Here, the "information about another user" may have a different format from the user identification information (e.g., IMPU) included in the management information about the first channel 1 and may be, e.g., a format of a name and/or phone number set by the other user or stored in the electronic device 101, but the format is not limited. In some cases, the user identification information included in the management information about the first channel 1 and the user information represented on the user interface may be identical to each other. A channel may be generated by performing the transmission of a channel invite message and at least one other procedure, and the at least one other procedure is described below.

Or, in another example, the electronic device 101 may receive a message (e.g., an invite request message) for the second user corresponding to the first external device 101b to invite the first user corresponding to the electronic device 101 to the channel. The electronic device 101 may transmit a confirm message (e.g., 200 OK message) based on obtaining the first user's confirm command. For example, the electronic device 101 may provide (e.g., display on screen and/or output in voice) a user interface for the second user's channel invitation and confirming or rejecting the invitation and may identify a user command (e.g., confirm command or reject command) corresponding thereto. Meanwhile, it is merely an example to transmit a confirm message (e.g., 200 OK message) based on obtaining the first user's confirm command, and the electronic device 101 may transmit the confirm message (e.g., 200 OK message) automatically without the user's confirm message. A channel may be generated by performing the reception of a channel invite message and at least one other procedure, and the at least one other procedure is described below.

By various methods described above, the electronic device 101 and the first external device 101b may generate, e.g., a one-to-one first channel 1. The first user corresponding to the electronic device 101 and the second user corresponding to the first external device 101b may participate in the first channel 1. At least one message and/or media data associated with the first channel 1 may be transmitted/received based on wireless communication, e.g., Wi-Fi communication or LTE communication (or WCDMA communication or 5G communication), and the type of communication is not limited. Meanwhile, the generation and/or management of the first channel 1 may be performed by the PTT server, which is described below.

According to various embodiments, the electronic device 101 may generate a second channel 2 of one-to-N (where N is a natural number not less than 2). The first user corresponding to the electronic device 101, a third user corresponding to a second external device 101c, a fourth user corresponding to a third external device 101e, and a fifth user corresponding to a fourth external device 101*f* may participate in the second channel 2. For example, the external device 101*e* may transmit/receive at least one message and/or media data associated with the second channel 2 through a relay external device 101*d* and Wi-Fi communication or LTE communication based on short-range communication, such as Bluetooth. The electronic device 101 may transmit a signal for outputting media data to an external output device (e.g., a wireless earphone) 102*a* through short-range communication, such as, e.g., Bluetooth. Meanwhile, although in the embodiment of FIG. 1B, the electronic device 101 is shown in the form of a smartphone, this is merely an example, and the electronic device 101 may be implemented in various forms, such as a smartphone or tablet, and its implementation form is not limited.

Figure 2:
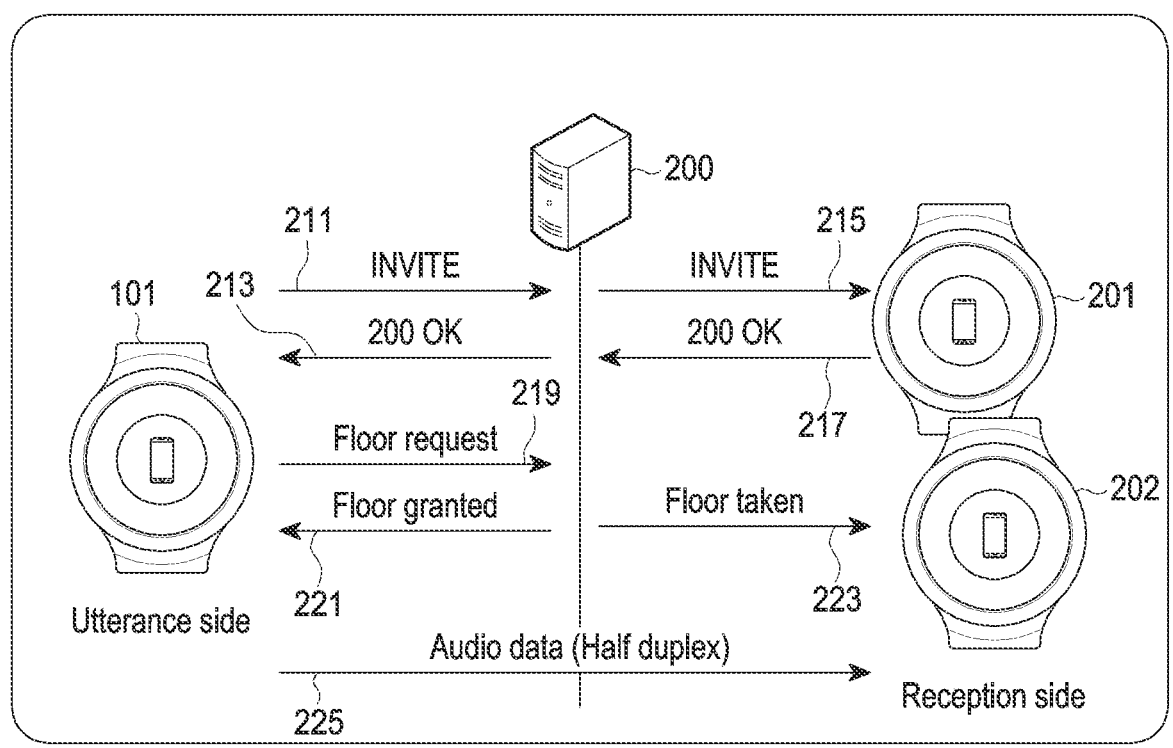
FIG. 2 is a flowchart illustrating an operation for establishing a session between an electronic device and an external device and a PTT server according to various embodiments of the disclosure.

FIG. 2 is a flowchart illustrating an operation for establishing a session between an electronic device and an external device and a PTT server according to various embodiments of the disclosure.

According to various embodiments, in operation 211, the electronic device 101 (e.g., the processor 120) may transmit a session initiation protocol (SIP)-based invite request message to the PTT server 200. In one example, before a channel is generated, the electronic device 101 may transmit an invite request message for the purpose of generating a channel and/or establishing a session. In another example, the electronic device 101 may transmit an invite request message for the purpose of generating a session when a channel has been already generated. For example, if transmission and/or reception of media data is not performed on the channel during a designated period (e.g., one minute) or longer, the session established corresponding to the channel may be released. Thereafter, if media data transmission and/or reception is additionally required, the electronic device 101 may transmit an invite request message to the PTT server 200 as in operation 211. In response to the invite request message, the PTT server 200 may transmit a 200 OK message corresponding thereto to the electronic device 101 in operation 213. In operation 215, the PTT server 200 may transmit the invite request message to at least one electronic device 201 and 202 corresponding to other users. Although FIG. 2 illustrates that invite request messages are transmitted to, e.g., two electronic devices 201 and 202, this is merely an example, and the number of counterpart devices participating in the channel (or using the session) is not limited.

According to various embodiments, the at least one electronic device 201 and 202 may transmit a 200 OK message in response to the received invite request message in operation 217. In one example, if there is no existing channel generated or the user of at least one electronic device 201 and 202 does not participate in the existing channel, the at least one electronic device 201 and 202 may provide a user interface capable of receiving a command as to whether to participate in the channel based on reception of the invite request message in operation 215. Upon identifying the user command to participate in the channel through the user interface, the at least one electronic device 201 and 202 may transmit a 200 OK message as in operation 217. In another example, if the session is released in the corresponding channel, with the user of the at least one electronic device 201 and 202 participating in the existing channel, the at least one electronic device 201 and 202 may transmit a 200 OK message, as in operation 217, automatically without receiving the user's command. A session corresponding to the channel participated in by the users of the electronic devices 101, 201, and 202 may be established based on transmission/reception of the channel request message and 200 OK message between the electronic device (e.g., the electronic device 101 of FIG. 2) transmitting the channel request message and the PTT server 200 and the transmission/reception of the channel request message and 200 OK message between the electronic device (e.g., the electronic device 201 or 202 in FIG. 2) receiving the channel request message and the PTT server 200. Meanwhile, the order of performing the 200 OK transmission in operation 213, transmission of the invite request message in operation 215, and the 200 OK transmission in operation 217 in FIG. 2 is not limited, and at least one additional SIP-based message may further be transmitted/received, which is described below.

According to various embodiments, in operation 219, the electronic device 101 may transmit a floor request message for utterance to the PTT server 200. Upon allowing the utterance of the user of the electronic device 101, the PTT server 200 may transmit a floor grant message to the electronic device 101 in operation 221. In operation 223, the PTT server 200 may transmit a floor taken message to at least one other electronic device 201 and 202 in operation 223. Thereafter, the electronic device 101 may transmit media data (e.g., audio data) to at least one other electronic device 201 and 202 in operation 225. The transmission of media data may be performed in, e.g., a half-duplex scheme, but is not limited thereto. The at least one other electronic device 201 and 202 may reproduce the received media data (e.g., output the voice corresponding to the audio data). Accordingly, the media data corresponding to the voice obtained by the electronic device 101 may be provided the at least one other electronic device 201 and 202 included in the channel (or using the session) so that other users may at least simultaneously listen to the voice uttered by the user of the electronic device 101.

Figure 3:
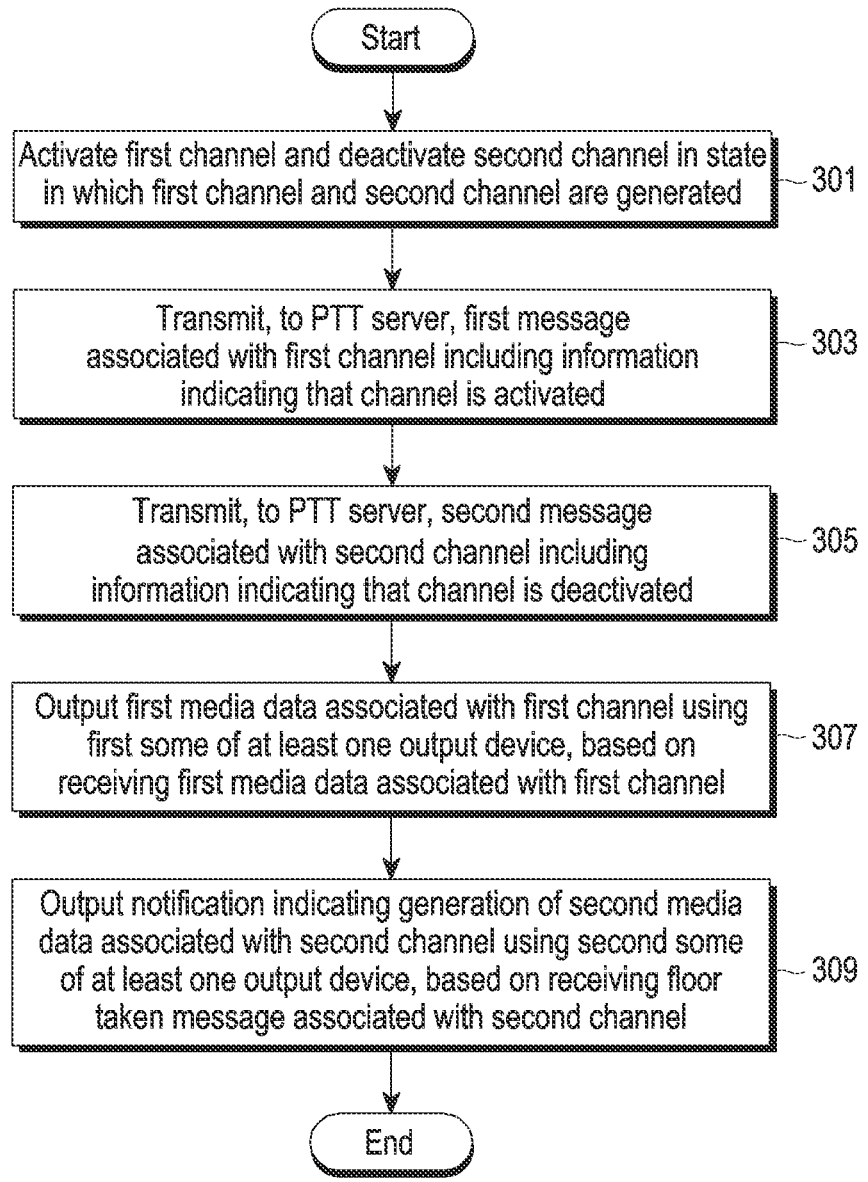
FIG. 3 is a flowchart illustrating an operation method of an electronic device according to various embodiments of the disclosure.
Figure 4A:
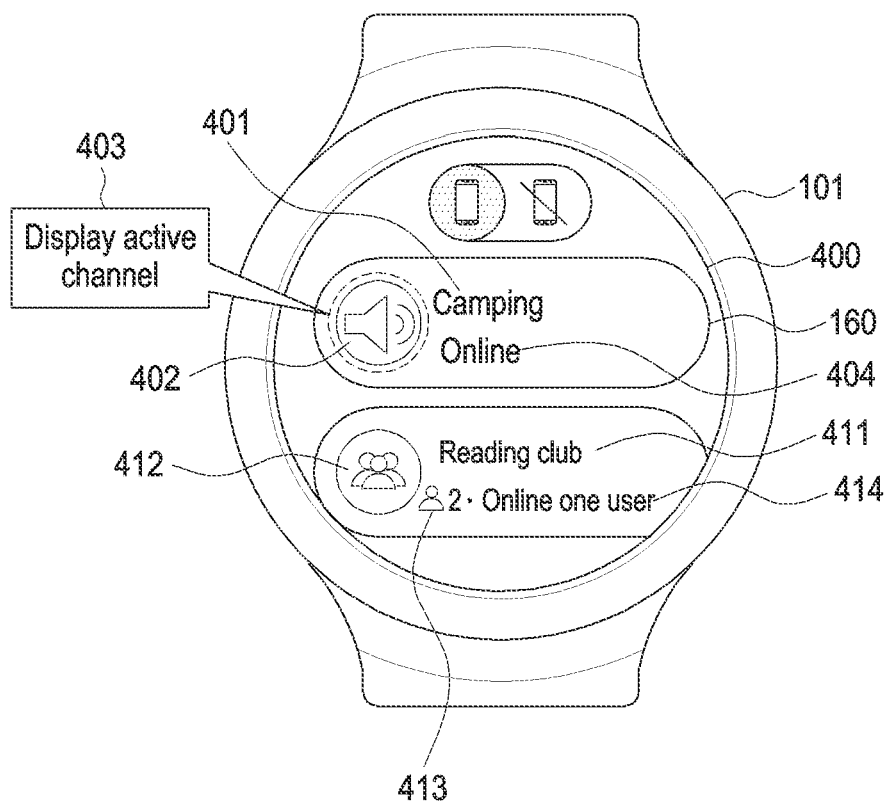
FIG. 4A is a view illustrating a screen indicating whether a channel is activated according to various embodiments of the disclosure.
Figure 4B:
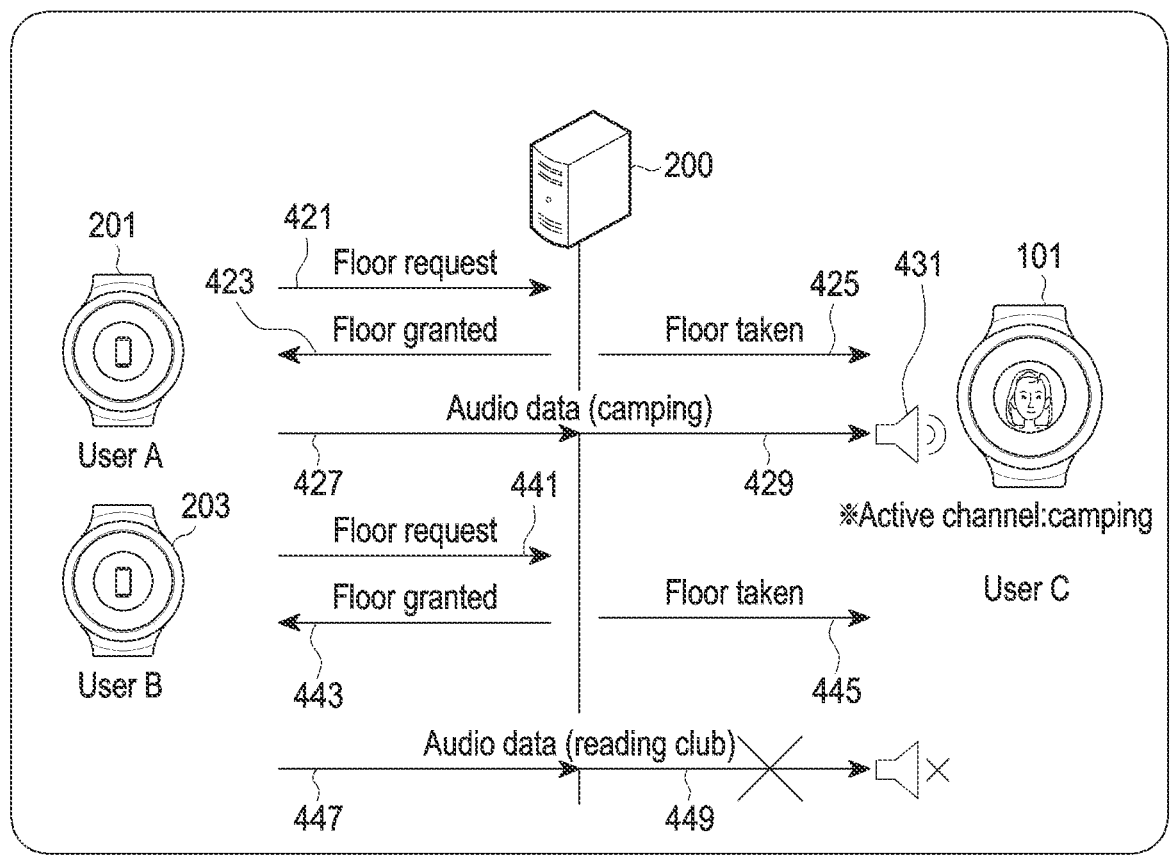
FIG. 4B is a view illustrating providing media data per channel according to various embodiments of the disclosure.

FIG. 3 is a flowchart illustrating an operation method of an electronic device according to various embodiments of the disclosure. The embodiment of FIG. 3 is described with reference to FIGS. 4A and 4B. FIG. 4A is a view illustrating a screen indicating whether a channel is activated according to various embodiments of the disclosure. FIG. 4B is a view illustrating providing media data per channel according to various embodiments of the disclosure.

According to various embodiments, in operation 301, the electronic device 101 (e.g., the processor 120) may activate a first channel and deactivate a second channel in a state in which the first channel and the second channel have been generated. For example, referring to FIG. 4A, the electronic device 101 may display an execution screen 400 of an application for providing a PTT service, on the display module 160. The application for providing the PTT service may be referred to as, e.g., a walkie-talkie application. The execution screen 400 may include a channel name 401 of the first channel, a visual object 402 indicating the first channel, and information (e.g., whether online) 404 associated with the user participating in the first channel. For example, there may be one counterpart user participating in the first channel, and information (e.g., whether online) 404 associated with the user participating in the first channel may be displayed as information about the one counterpart user. The execution screen 400 may include a channel name 411 of the second channel, a visual object 412 indicating the second channel, the number 413 of users participating in the second channel, and information (e.g., the number of online participants) 414 associated with the users participating in the second channel. Meanwhile, it will be appreciated by one of ordinary skill in the art that in addition to the above-described information, information associated with the channel may further be displayed, and at least some channel-associated information may not be displayed. The electronic device 101 may display a currently activated channel, e.g., a visual object 403 indicating that the first channel of FIG. 4A has been activated, in association with (e.g., around) information associated with the first channel, e.g., the visual object 402. The visual object 403 indicating that the channel has been activated may not be displayed in association with a deactivated channel, e.g., the second channel of FIG. 4A. Based on detecting a trigger for activating the first channel and deactivating the second channel, the electronic device 101 may display an execution screen 400 including the visual object 403 indicating that the first channel has been activated. Meanwhile, although not shown, based on detecting a trigger for activating the second channel and deactivating the first channel, the electronic device 101 may display a visual object (e.g., a visual object having substantially the same shape as the visual object 403) indicating that the channel has been activated, to the visual object 412 indicating the second channel while stopping displaying the existing visual object 403. Hereinafter, various triggers for causing activation and/or deactivation of a specific channel are described.

In one example, the electronic device 101 may identify selection of any one of a plurality of channels, as a trigger, while providing a user interface (e.g., while displaying the execution screen 400) for selecting any one of the plurality of channels and activate the selected channel. The electronic device 101 may enter the selected channel and additionally display the screen associated with the corresponding channel or display a visual object indicating that the channel has been activated in association with the selected channel. In one example, the electronic device 101 may identify generation of a new channel as a trigger and activate the new channel. In one example, the electronic device 101 may identify participation in the specific channel according to acceptance for the invitation to the specific channel, as a trigger, and activate the specific channel. In one example, the electronic device 101 may output a notification based on reception of a floor taken message corresponding to the channel in the deactivated state which is described below. In this case, the electronic device 101 may identify a command for entry into the corresponding channel for the notification, as a trigger, and activate the corresponding channel. If any one channel of the plurality of channels is activated, the electronic device 101 may deactivate the remaining channels. The above-described trigger is a trigger for activating the specific channel, and described above is an example in which the existing activated channel is deactivated as any one specific channel is activated. According to various embodiments, the electronic device 101 may also detect a trigger for deactivating the specific channel. For example, the electronic device 101 may deactivate the specific channel based on a user input or deactivate the specific channel based on meeting a specific condition even without a user input. In some cases, all channels managed by the electronic device 101 may be in the deactivated state.

Meanwhile, in another embodiment, the electronic device 101 may activate two or more channels. If two or more channels are activated, and media data is generated at least simultaneously in the two or more activated channels, the PTT server 200 may transmit, to the electronic device 101, the media data generated from the channel with higher priority among the activated channels. The priority may be set by the user's input or may be determined according to a priority determination condition, e.g., such that the channel where media data is most recently generated is automatically assigned higher priority. Or, the PTT server 200 may transmit media data to the electronic device 101 in all of the plurality of activated channels. In this case, the electronic device 101 may output the media data received from the channel with higher priority among the plurality of channels or, in another embodiment, output the media data simultaneously received from the plurality of channels.

Referring back to FIG. 3, in operation 303, the electronic device 101 may transmit, to the PTT server 200, a first message associated with the first channel including information indicating that the first channel is activated. For example, the first message may be an SIP-based invite request message for establishing a session corresponding to the first channel or may be an invite request message transmitted again, with the session corresponding to the first channel already established. Meanwhile, the procedure of transmitting again an invite request message with a session already established may be referred to as a re-invite procedure or the corresponding message may be referred to as a re-invite request message. Table 1 shows an example of the first message including information indicating that the channel has been activated according to various embodiments.

TABLE 1

INVITE sip:PoC-Group-Session@samsungims.com;session=adhoc SIP/2.0
Via: SIP/2.0/TCP 192.168.0.2;branch=z9hG4bKnashds8
Max-Forwards: 70
To: <sip:PoC-Group-Session@samsungims.com;session=adhoc>;tag=232d23
From: "+821012345678" <sip:ClientA@samsungims.com>;tag=cbafb05f
Call-ID: wSIrjEuSWpX6qJUSRt0K2g
CSeq: 2 INVITE
Contact:
<sip:ClientA@samsungims.com;session=adhoc>;+sip.instance="<urn:uuid:000000-000-000>";+g.poc.talkburst
    Accept-Contact: *;+g.poc.talkburst;explicit;require
    P-Preferred-Identity: "+821012345678" <sip:ClientA@samsungims.com>
    Supported: timer
    Session-Expires: 1800
    Subject: <Group PTT channel_name>
    Allow: INVITE,ACK,CANCEL,BYE,REFER,OPTIONS,MESSAGE
    User-Agent: PoC-client/OMA2.0 Acme-Talk5000/v1.01
    Content-Type: application/sdp
    Content-Length: ...
    v=0
    o=SAMSUNG-IMS-UE 1524478557377083 0 IN IP4 192.168.0.2
    s=

TABLE 1-continued

```
c=IN IP4 192.168.0.2
t=0 0
m=audio 1234 RTP/AVP 100
b=AS:41
b=RS:0
b=RR:0
a=rtpmap:100 AMR-WB/16000/1
a=fmtp: 100 octet-align=1;max-red=0
a=sendrecv
a=ptime:20
a=maxptime:12
a=label:as
m=application 2000 udp MBCP
a=fmtp: MBCP tb_priority=1;multimedia=1;imp_mb_req=1
a=floorid:0 mstrm:as
```

In Table 1, "a=sendrecv" emphasized with an underline may be information indicating that a channel and/or a session is activated. The electronic device 101 may transmit, to the PTT server 200, a first message including information indicating that, e.g., the channel as shown in Table 1 is activated, but the format is not limited. The PTT server 200 may manage the corresponding channel and/or session as activated, based on activation information as shown in Table 1 included in the first message received based on the corresponding channel and/or session. According to various embodiments, in operation 305, the electronic device 101 may transmit, to the PTT server 200, a second message associated with the second channel including information indicating that the second channel is deactivated. For example, the second message may be an SIP-based invite request message for establishing a session corresponding to the second channel or may be an invite request message transmitted again, with the session corresponding to the second channel already established. For example, instead of "a=sendrecv" of Table 1, the second message may include "a=inactive", which is information indicating that the second channel is deactivated, but the format is not limited. The PTT server 200 may manage the corresponding channel and/or session as deactivated, based on deactivation information included in the first message received based on the corresponding channel and/or session. Table 2 shows an example of management information for each channel managed by the PTT server 200 and/or the electronic device 101 according to various embodiments.

TABLE 2

| channel identification information | channel participant | active state |
|---|---|---|
| first channel | IMPU #1 | 1 |
|  | IMPU #2 | 0 |
| second channel | IMPU #1 | 0 |
|  | IMPU #3 | 1 |
|  | IMPU #4 | 1 |

The channel identification information in Table 2 may be information for identifying the channel and its format is not limited, and may also be referred to as group identification information. The channel participant may be identification information about each of at least one participant participating in the corresponding channel and, although represented as the IMPU value in Table 2 as an example, but the format is not limited. As the activation state, e.g., "1" indicates the active state, and "0" indicates the inactive state, but the values are exemplary. For example, it is assumed that the user identification information corresponding to the electronic device 101 is IMPU #1. In the example of Table 2, the first user (user having the identification information of IMPU #1) has activated the first channel, and the second user (user having the identification information of IMPU #2) may deactivate the first channel. In the example of Table 2, the first user (user with the identification information of IMPU #1) deactivated the second channel, the third user (user with the identification information of IMPU #3) activated the second channel, and the fourth user (user with the identification information of IMPU #4) may activate the second channel. If activation information about the specific channel associated with the specific user is changed, operations 303 and 305 may be performed, so that the per-channel management information managed by the PTT server 200 and/or the electronic device 101 may be updated. For example, the electronic device 101 may deactivate the first channel and activate the second channel and transmit messages indicating the same to the PTT server 200. In this case, the per-channel management information managed by the PTT server 200 and/or electronic device 101 may be updated as shown in Table 3.

TABLE 3

| channel identification information | channel participant | active state |
|---|---|---|
| first channel | IMPU #1 | 0 |
|  | IMPU #2 | 0 |
| second channel | IMPU #1 | 1 |
|  | IMPU #3 | 1 |
|  | IMPU #4 | 1 |

As shown in Table 3, the activation state of the first channel corresponding to the identification information (IMPU #1) about the user corresponding to the electronic device 101 may be updated to "0", and the activation state of the second channel corresponding to the identification information (IMPU #1) about the user may be updated to "1". Referring back to FIG. 3, according to various embodiments, in operation 307, the electronic device 101 may output, using first part of at least one output device, received first media data associated with the first channel, based on reception of the first media data associated with the first channel. For clarity of the description, it is assumed that the electronic device 101 receives the first media data associated with the first channel in a state in which the first channel is activated and in a state in which the second channel is deactivated (e.g., the state corresponding to Table 2). For example, referring to FIG. 4B, a floor request message for an utterance may be transmitted from the electronic device 201 corresponding to user A participating in the first channel to the PTT server 200 in operation 421. The PTT server 200 may transmit a floor grant message to the electronic device 201 corresponding to user A in operation 423. The PTT server 200 may transmit a floor taken message to the electronic device 101 corresponding to the user participating in the first channel in operation 425. Thereafter, the electronic device 201 may transmit media data (e.g., audio data) to the PTT server 200 in operation 427, and the PTT server 200 may transmit media data (e.g., audio data) to the electronic device 101 in operation 429. The PTT server 200 may identify that the user (e.g., IMPU #1) corresponding to the electronic device 101 has activated the first channel by referring to the per-channel management information, e.g., as shown in Table 2. Accordingly, in operation 429, the PTT server 200 may transmit the media data received from the electronic device 201 to the electronic device 101. In operation 429, the electronic device 101 may output the voice corresponding to the media data using first part, e.g., at least one speaker (e.g., speaker 431), among the at least one output device, and the format of media data and the output device for outputting the media data are not limited.

Referring back to FIG. 3, according to various embodiments, in operation 309, the electronic device 101 may output, using second part of at least one output device, a notification indicating that second media data associated with the second channel is generated based on reception of the floor taken message associated with the second channel. For clarity of the description, it is assumed that the electronic device 101 receives the floor taken message associated with the second channel in a state in which the first channel is activated and in a state in which the second channel is deactivated (e.g., the state corresponding to Table 2). For example, referring to FIG. 4B, a floor request message for an utterance may be transmitted from the electronic device 203 corresponding to user B participating in the second channel to the PTT server 200 in operation 441. The PTT server 200 may transmit a floor grant message to the electronic device 203 corresponding to user B in operation 443. The PTT server 200 may transmit a floor taken message to the electronic device 101 corresponding to the user participating in the second channel in operation 445. Thereafter, the electronic device 203 may transmit media data (e.g., audio data) to the PTT server 200 in operation 447. The PTT server 200 may identify that the user (e.g., IMPU #1) corresponding to the electronic device 101 has deactivated the second channel by referring to the per-channel management information, e.g., as shown in Table 2. Based thereupon, the PTT server 200 may refrain (e.g., in operation 449) from transmission of the media data corresponding to the second channel to the electronic device 101. Since the electronic device 101 has failed to receive the media data associated with the second channel, the media data may not be output. Meanwhile, based on reception of the floor taken message, the electronic device 101 may output a notification indicating that the media data is generated from the second channel, using second part (e.g., the display module 160, an LED, a speaker, and/or a vibration module) among the at least one output device.

For example, the notification may include information (e.g., name) about the user transmitting the media data and/or the identification information about the second channel, but the included information is not limited. For example, the "source description RTP Packets (SDES) item CNAME flowed by SDES item NAME" field of the floor occupancy message may include the identification information (e.g., IMPU) about the uttering user (e.g., transmitting the floor request message and/or receiving the floor grant message). The electronic device 101 may output the information (e.g., name) about the uttering user, as at least part of the notification, based on the identification information (e.g., IMPU) about the user. Or, the notification may be an output that does not include particular information, such as a flicker of an LED, beep output through a speaker, and/or vibration of the vibration module. Or, the notification may be a combination of a notification including information and a notification including no information. For example, at least one output device for outputting media data and at least one output device for outputting a notification indicating that media data is generated may be at least partially different. However, this is an example, and at least one output device for outputting media data and at least one output device for outputting a notification indicating that media data is generated may be the same. For example, the electronic device 101 may output a voice, e.g., "Media data is generated from the second channel" or "User B is uttering on the second channel," through at least one speaker based on reception of the floor taken message.

As described above, as the electronic device 101 does not receive media data in the deactivated state, battery power and/or resource consumption may be prevented.

Figure 5:
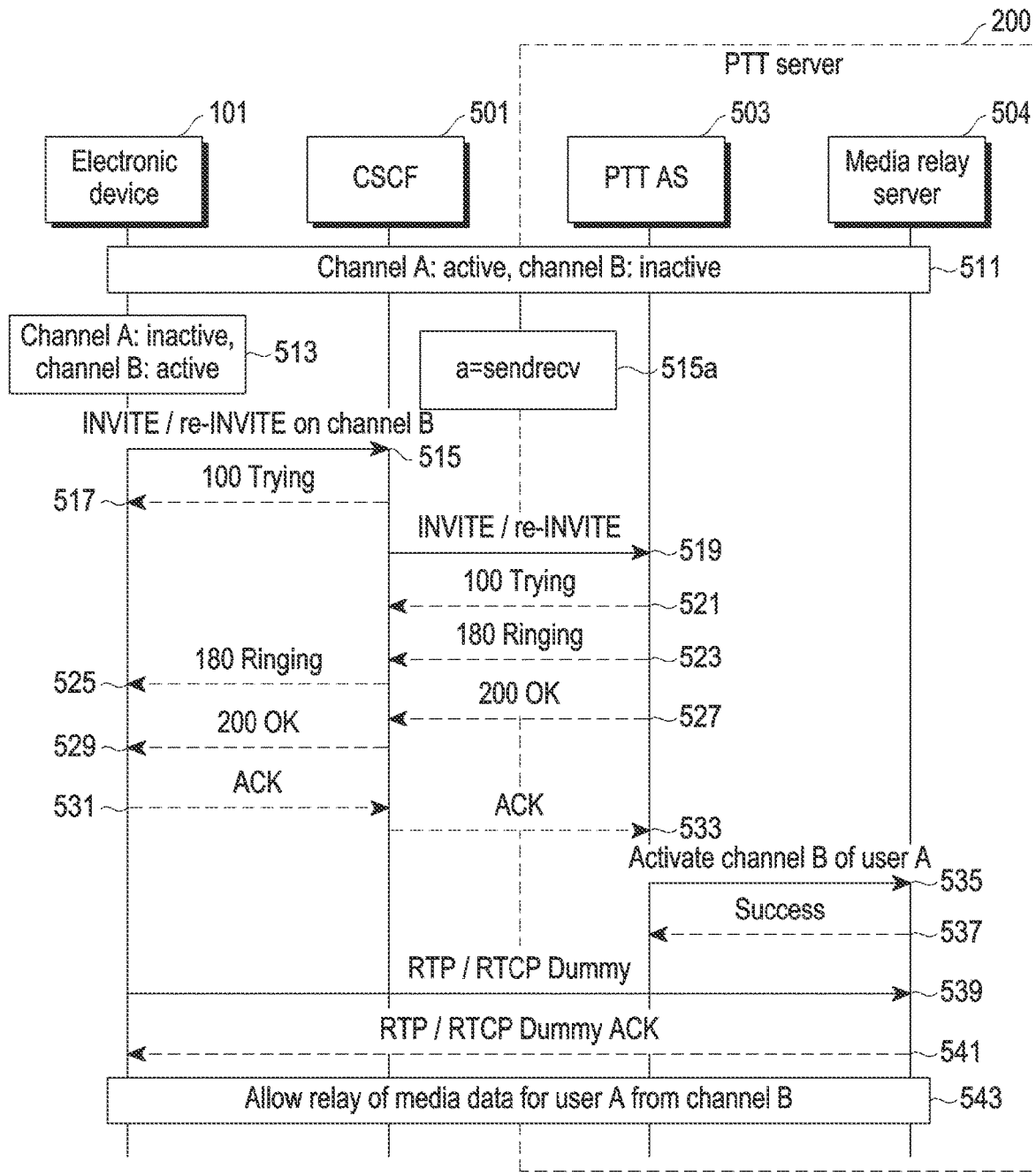
FIG. 5 is a flowchart illustrating an operation method of an electronic device, a call session control function (CSCF), and a PTT server according to various embodiments of the disclosure.

FIG. 5 is a flowchart illustrating an operation method of an electronic device, a call session control function (CSCF), and a PTT server according to various embodiments of the disclosure.

According to various embodiments, the electronic device 101 (e.g., the processor 120), the CSCF 501, and the PTT server 200 may manage channel A in the activated stated and channel B in the deactivated state in operation 511. The CSCF 501 may include, e.g., P(proxy)-CSCF, S(serving)-CSCF, and/or I(interrogation)-CSCF and may be included in an IMS server. The CSCF 501 may process an SIP-based message. The PTT server 200 may include a PTT application server (AS) 503 and a media relay server 504. The PTT AS 503 may process an SIP-based message. The media relay server 504 may relay media data between users participating in the channel (or using the session).

According to various embodiments, in operation 513, the electronic device 101 may deactivate channel A and deactivate channel B. As described above, the electronic device 101 may deactivate channel A and activate channel B based on detection of various triggers. In operation 515, the electronic device 101 may transmit an invite request message or re-invite request message associated with channel B to the CSCF 501. Meanwhile, as described above, the re-invite request message may mean an invite request message in a state in which a session is established. The invite request message or re-invite request message may include the attribute (a) 515a "sendrecv" indicating that the channel is activated. In operation 517, the CSCF 501 may transmit an SIP-based 100 Trying message to the electronic device 101. In operation 519, the CSCF 501 may transmit an invite request message or re-invite request message to the PTT AS 503. In operation 521, the PTT AS 503 may transmit an SIP-based 100 Trying message to the CSCF 501. In operation 523, the PTT AS 503 may transmit an SIP-based 180 Ringing message to the CSCF 501. In operation 525, the CSCF 501 may transmit an SIP-based 180 Ringing message to the electronic device 101. In operation 527, the PTT AS 503 may transmit an SIP-based 200 OK message to the CSCF 501. In operation 529, the CSCF 501 may transmit an SIP-based 200 OK message to the electronic device 101. In operation 531, the electronic device 101 may transmit an SIP-based ACK message to the CSCF 501. In operation 533, the CSCF 501 may transmit an SIP-based ACK message to the PTT AS 503.

According to various embodiments, the PTT AS 503 may transmit a message requesting activation of channel B associated with user A (e.g., client A) to the media relay server 504 in operation 535. The message may be expressed, e.g., in the format of "POST/mclbrpc.McLb/setConnectionStatus HTTP/2.0(w/groupId,impu,active=true)", but the format is not limited. "groupID" included in the message may be identification information about the channel (or group). "impu" may be identification information (e.g., IMPU) about the user (e.g., user A in FIG. 5) to which a setting for the corresponding channel is applied. "active=true" may indicate the active state, and if the corresponding channel is the inactive state, it may be expressed as "active=false." In operation 535, the format of the message indicating that user A activates channel B may be "POST/mclbrpc.McLb/setConnectionStatus HTTP/2.0(w/"group B", "IMPU A", active=true)", and "group B" may be identification information about channel B, and "IMPU A" may be the IMPU of user A. The media relay server 504 may identify that user A activates channel B based on the received message. In operation 537, the media relay server 504 may transmit a success message identifying to change the attribute of the channel (e.g., active state) to the PTT AS 503.

According to various embodiments, in operation 539, the electronic device 101 may transmit a dummy packet, based on the realtime transport protocol (RTP) or RTP control protocol (RTCP), to the media relay server 504. The electronic device 101 may transmit the dummy packet to the media relay server 504 to set up an RTP transmission/reception channel with the PTT server 200. The electronic device 101 may generate a user datagram protocol (UDP) socket and, based thereupon, transmit the dummy packet to the media relay server 504. A normal RTP packet may include a UDP header, and the UDP payload may include data of RTP or RTCP (e.g., audio data and/or video data). In the dummy packet, the payload includes no data, and in the payload type, "20" may be used, which may be an unassigned value, but is exemplary, and the expression format is not limited. In operation 541, the media relay server 504 may transmit an RTP- or PRCP-based dummy ack packet to the electronic device 101. Accordingly, an RTP transmission/reception channel may be set up between the electronic device 101 and the media relay server 504. Subsequently, the electronic device 101 may transmit a PRT packet including media data to the media relay server 504 based on the RTP transmission/reception channel. In operation 543, the electronic device 101, the CSCF 501, and the PTT server 200 may permit relay of media data for user A on channel B. Meanwhile, the dashed lines in FIGS. 6 and 9 denote optional operations which may be, or may not be, performed, but this is also exemplary. According to various embodiments of the disclosure, it will be appreciated by one of ordinary skill in the art that at least one operation may not be performed, an additional operation may be performed, or the order of the operations is not limited to that shown.

Figure 6:
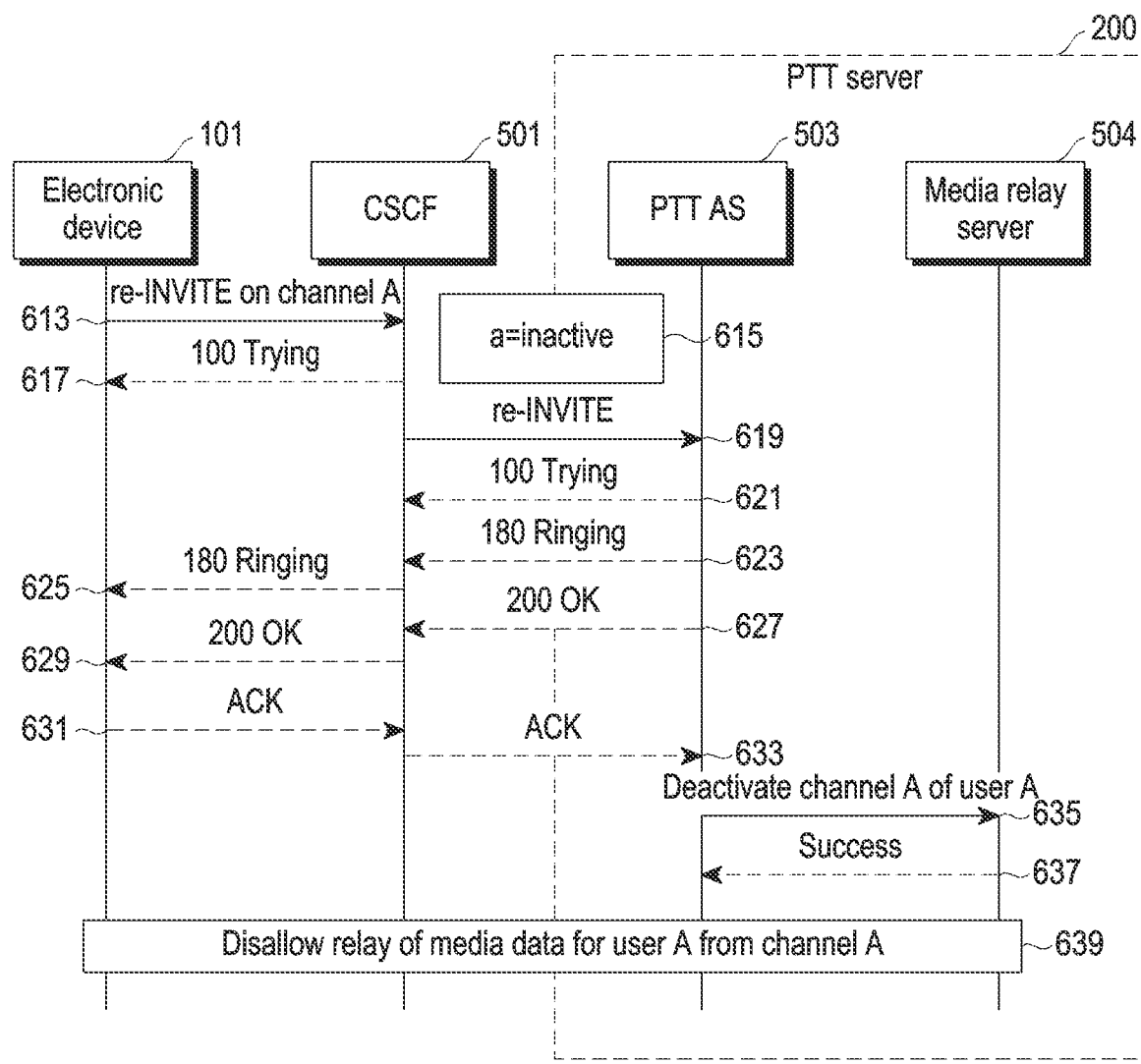
FIG. 6 is a flowchart illustrating an operation method of an electronic device, a CSCF, and a PTT server according to various embodiments of the disclosure.

FIG. 6 is a flowchart illustrating an operation method of an electronic device, a CSCF, and a PTT server according to various embodiments of the disclosure. FIG. 6 may be an operation after the electronic device 101 deactivates channel A, e.g., a subsequent operation to FIG. 5 in which the electronic device 101 activates channel B. However, performing the operation of deactivating channel A as shown in FIG. 6 after the operation of activating channel B as shown in FIG. 5 is merely an example and, according to various embodiments, the electronic device 101 may perform the operation of deactivating channel A and then perform the operation of activating channel B.

According to various embodiments, in operation 613, the electronic device 101 (e.g., the processor 120) may transmit a re-invite request message associated with channel B to the CSCF 501 on channel A (e.g., group A). The re-invite request message may include the attribute (a) 615 "inactive" indicating that the channel is deactivated. In operation 617, the CSCF 501 may transmit an SIP-based 100 Trying message to the electronic device 101. In operation 619, the CSCF 501 may transmit a re-invite request message to the PTT AS 503. In operation 621, the PTT AS 503 may transmit an SIP-based 100 Trying message to the CSCF 501. In operation 623, the PTT AS 503 may transmit an SIP-based 180 Ringing message to the CSCF 501. In operation 625, the CSCF 501 may transmit an SIP-based 180 Ringing message to the electronic device 101. In operation 627, the PTT AS 503 may transmit an SIP-based 200 OK message to the CSCF 501. In operation 629, the CSCF 501 may transmit an SIP-based 200 OK message to the electronic device 101. In operation 631, the electronic device 101 may transmit an SIP-based ACK message to the CSCF 501. In operation 633, the CSCF 501 may transmit an SIP-based ACK message to the PTT AS 503.

According to various embodiments, the PTT AS 503 may transmit a message requesting deactivation of channel A associated with user A (e.g., client A) to the media relay server 504 in operation 635. The format of the message indicating that user A deactivates channel A may be "POST/mclbrpc.McLb/setConnectionStatus HTTP/2.0 (w/"group B", "IMPU A", active=false)". The media relay server 504 may identify that user A deactivates channel A based on the received message. In operation 637, the media relay server 504 may transmit a success message identifying to change the attribute of the channel (e.g., active state) to the PTT AS 503. In operation 639, the electronic device 101, the CSCF 501, and the PTT server 200 may not permit relay of media data for user A on channel A. For example, upon receiving a floor request message from another participant of channel A, the PTT server 200 may transmit a floor grant message to the corresponding participant and transmit a floor taken message to the electronic device 101 corresponding to user A. Further, the PTT server 200 may transmit media data to the participant that has activated channel A among the other participants than user A, without transmitting media data from other participants to the electronic device 101 corresponding to user A.

Figure 7:
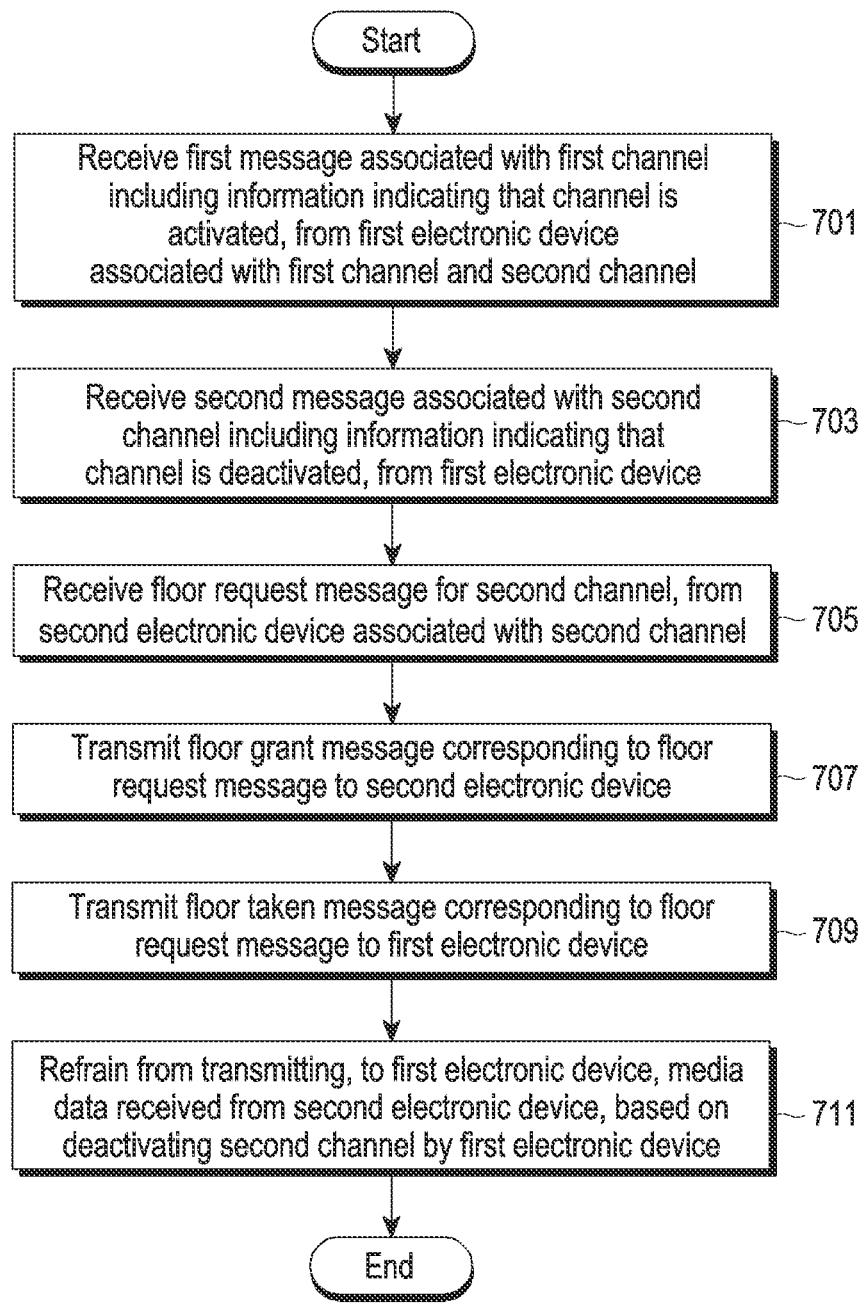
FIG. 7 is a flowchart illustrating an operation method of a PTT server according to various embodiments of the disclosure.

FIG. 7 is a flowchart illustrating an operation method of a PTT server according to various embodiments of the disclosure. According to various embodiments, the PTT server 200 may include at least one processor and at least one communication module circuitry. The operation of the PTT server of the disclosure may be performed by at least one processor and/or at least one communication module circuitry.

According to various embodiments, in operation 701, the PTT server 200 may receive a first message associated with a first channel including information indicating that the channel is activated, from the first electronic device associated with the first channel and the second channel. The PTT server 200 may identify that the first user of the first electronic device activates the first channel based on the first message. In operation 703, the PTT server 200 may receive a second message associated with the second channel including information indicating that the second channel is deactivated, from the first electronic device. The PTT server

200 may identify that the first user of the first electronic device deactivates the second channel based on the second message. The PTT server 200 may manage association information between user and whether activated, for each channel as shown in Table 2 or 3, for example.

According to various embodiments, in operation 705, the PTT server 200 may receive a floor request message for the second channel, from a second electronic device associated with the second channel, e.g., the second electronic device corresponding to the user participating in the second channel. In operation 707, the PTT server 200 may transmit a floor grant message corresponding to the floor request message to the second electronic device. In operation 709, the PTT server 200 may transmit a floor taken message corresponding to the floor request message to the first electronic device. If other users than the first user of the second channel and the user of the second electronic device participate in the second channel, the PTT server 200 may transmit the floor taken message to the electronic devices corresponding to the other users. In operation 711, the PTT server 200 may refrain from transmitting the media data received from the second electronic device to the first electronic device based on the first electronic device deactivating the second channel. If other users than the first user and the user of the second electronic device participate in the second channel, the PTT server 200 may transmit media data from the second electronic device to the electronic devices corresponding to the other users.

Figure 8:
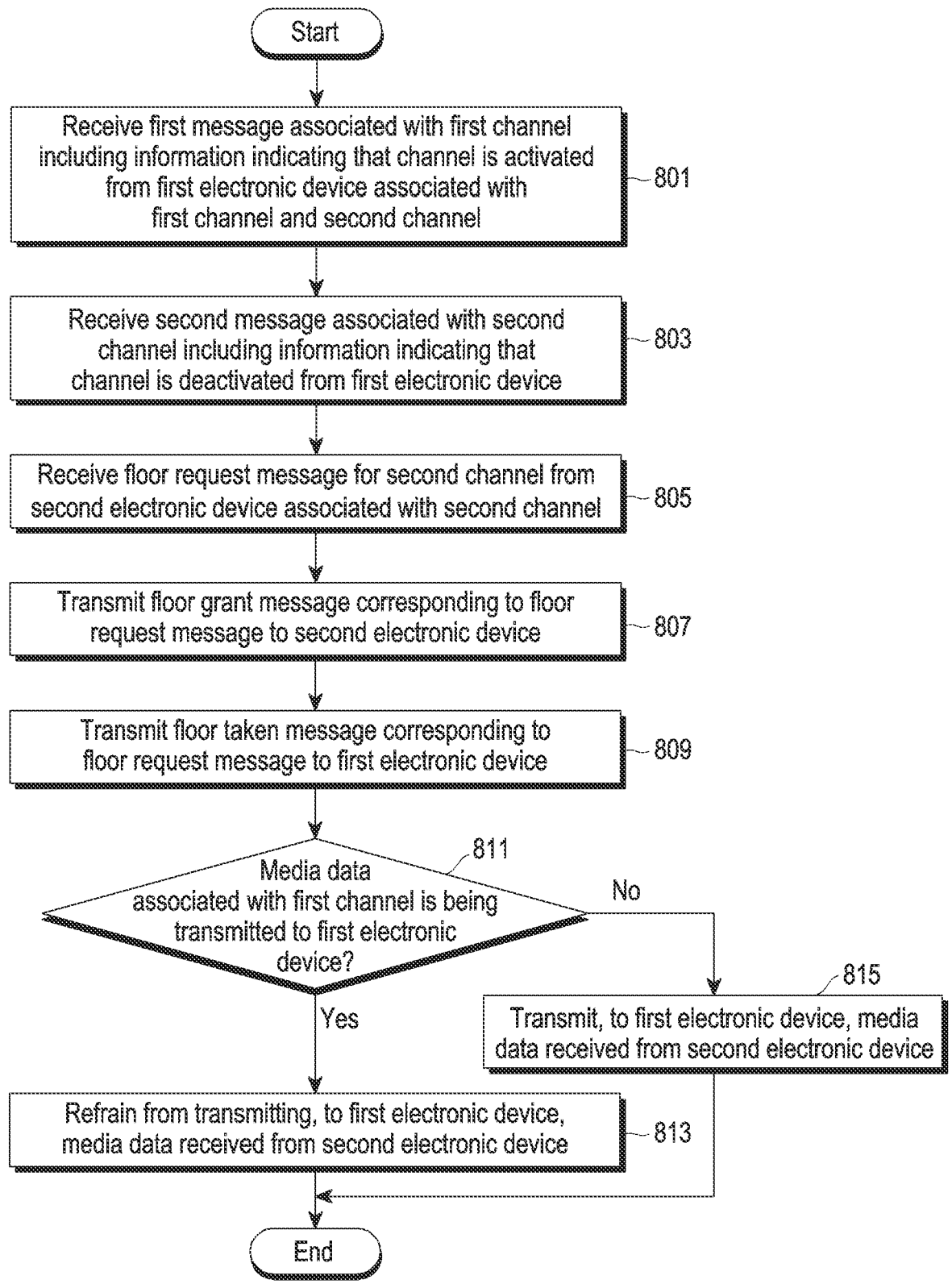
FIG. 8 is a flowchart illustrating an operation method of a PTT server according to various embodiments of the disclosure.

FIG. 8 is a flowchart illustrating an operation method of a PTT server according to various embodiments of the disclosure.

According to various embodiments, in operation 801, the PTT server 200 may receive a first message associated with a first channel including information indicating that the channel is activated, from the first electronic device associated with the first channel and the second channel. The PTT server 200 may identify that the first user of the first electronic device activates the first channel based on the first message. In operation 803, the PTT server 200 may receive a second message associated with the second channel including information indicating that the second channel is deactivated, from the first electronic device. The PTT server 200 may identify that the first user of the first electronic device deactivates the second channel based on the second message. In operation 805, the PTT server 200 may receive a floor request message for the second channel, from a second electronic device associated with the second channel, e.g., the second electronic device corresponding to the user participating in the second channel. In operation 807, the PTT server 200 may transmit a floor grant message corresponding to the floor request message to the second electronic device. In operation 809, the PTT server 200 may transmit a floor taken message corresponding to the floor request message to the first electronic device.

According to various embodiments, in operation 811, the PTT server 200 may identify whether media data associated with the first channel, e.g., an activated channel, is being transmitted to the first electronic device, based on transmission of the floor grant message and transmission of the floor taken message. Or alternatively, the PTT server 200 may identify whether the media data is being transmitted to the first electronic device on the other channels than the deactivated second channel. Upon identifying that the media data associated with the first channel which is the activated channel is being transmitted to the first electronic device (Yes in 811), the PTT server 200 may refrain from transmitting the media data received from the second electronic device to the first electronic device in operation 813. Upon identifying that the media data associated with the first channel which is the activated channel is not being transmitted (No in operation 811), the PTT server 200 may transmit the media data received from the second electronic device to the first electronic device in operation 815. If media data from another channel is currently transmitted to the first electronic device, the PTT server 200 may refrain from transmission of media data from the deactivated channel, but if the media data from the other channel is not currently transmitted to the first electronic device, permit transmission of media data from the deactivated channel.

Meanwhile, although not shown, the PTT server 200 may identify that media data is generated from the activated first channel while transmitting media data from the deactivated channel as media data from the other channel is not currently transmitted to the first electronic device. In this case, the PTT server 200 may stop transmitting media data from the deactivated second channel and transmit media data from the first channel to the first electronic device.

Figure 9:
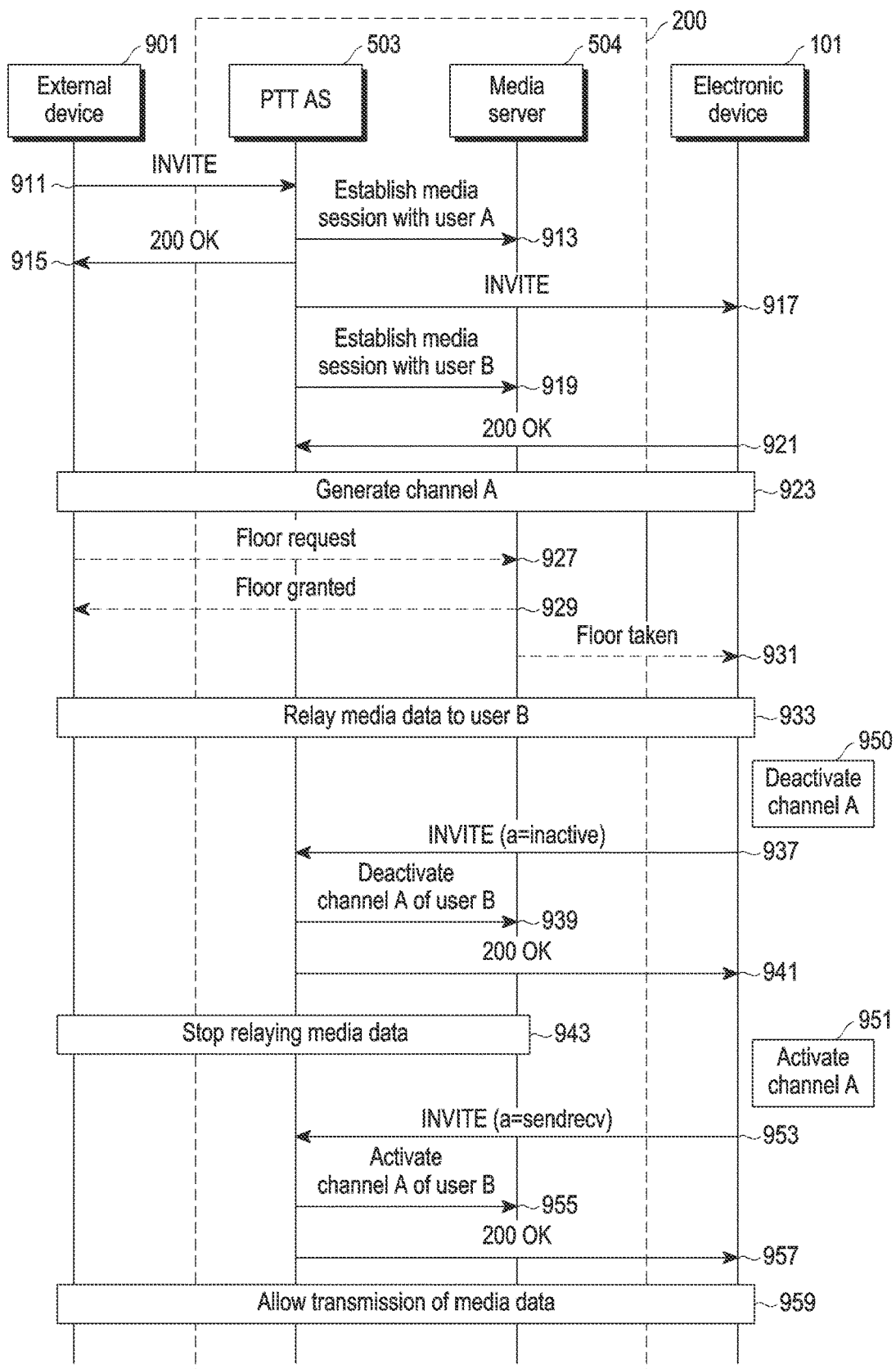
FIG. 9 is a flowchart illustrating an operation method of an electronic device, a CSCF, and a PTT server according to various embodiments of the disclosure.

FIG. 9 is a flowchart illustrating an operation method of an electronic device, a CSCF, and a PTT server according to various embodiments of the disclosure.

According to various embodiments, it is assumed that the external device 901 corresponding to user A invites user B corresponding to the electronic device 101 to generate channel A. In operation 911, the external device 901 may transmit an invite request message to the PTT AS 503. In operation 913, the PTT AS 503 may request the media relay server 504 to generate a media session with user A. In operation 915, the PTT AS 503 may transmit a 200 OK message to the external device 901. In operation 917, the PTT AS 503 may transmit an invite request message to the electronic device 101. In operation 919, the PTT AS 503 may request the media relay server 504 to generate a media session with user B corresponding to the electronic device 101. In operation 921, the electronic device 101 may transmit a 200 OK message to the PTT AS 503. For example, the electronic device 101 may provide a user interface capable of receiving a user input about whether to participate in channel A. Based on a user command to participate in channel A through the user interface, the electronic device 101 may transmit a 200 OK message to the PTT AS 503. In operation 923, channel A may be generated. Meanwhile, based on generation of channel A, the electronic device 101 and the PTT server 200 may manage channel A as activated for user A. Based on participating in the invitation to channel A, the electronic device 101 and the PTT server 200 may manage channel A as activated for user B.

According to various embodiments, the external device 901 corresponding to user A may transmit a floor request message for utterance to the media relay server 504 in operation 927. In operation 929, the media relay server 504 may transmit a floor grant message corresponding to the floor request message to the external device 901. In operation 931, the media relay server 504 may transmit a floor taken message corresponding to the floor request message to the electronic device 101. As described above, the media relay server 504 may relay the media data from the external device 901 to the electronic device 101, based on user B activating channel A in operation 933.

Meanwhile, the electronic device 101 may deactivate channel A while the media data is relayed in operation 950. For example, the electronic device 101 may deactivate channel A based on detection of a trigger for activating a channel other than channel A or a trigger for deactivating channel A. In operation 937, the electronic device 101 may transmit an invite request message including information (a=inactive) indicating that the channel is deactivated to the PTT AS 503. Based on reception of the invite request message including the information (a=inactive) indicating that the channel is deactivated, the PTT AS 503 may transmit a message indicating that user B deactivates channel A to the media relay server 504 in operation 939. In operation 941, the PTT AS 503 may transmit a 200 OK to the electronic device 101. The media relay server 504 may stop relaying the media data received from the external device 901 to the electronic device 101 based on deactivation of channel A by user B in operation 943.

Meanwhile, the electronic device 101 may activate channel A again in operation 951. For example, the electronic device 101 may activate channel A based on detection of a trigger for activating channel A. In operation 953, the electronic device 101 may transmit an invite request message including information (a=sendrecv) indicating that the channel is activated to the PTT AS 503. Based on reception of the invite request message including the information (a=sendrecv) indicating that the channel is activated, the PTT AS 503 may transmit a message indicating that user B activates channel A to the media relay server 504 in operation 955. In operation 957, the PTT AS 503 may transmit a 200 OK to the electronic device 101. The media relay server 504 may permit relaying the media data received from the external device 901 to the electronic device 101 based on activation of channel A by user B in operation 959.

Figure 10:
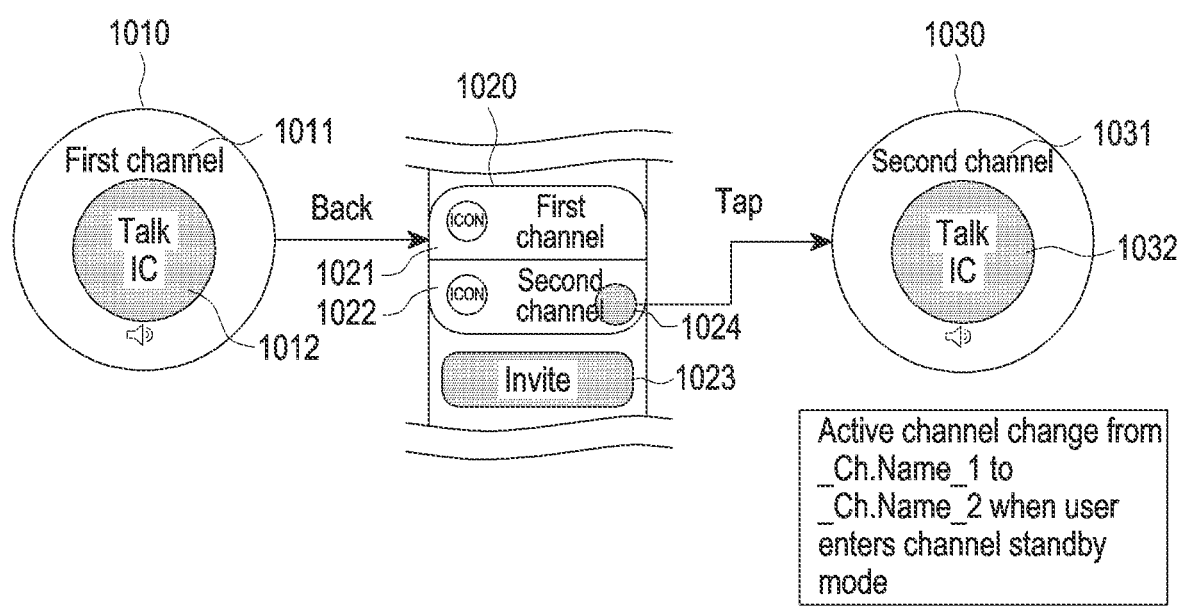
FIG. 10 is a view illustrating a user interface provided by an electronic device according to various embodiments of the disclosure.

FIG. 10 is a view illustrating a user interface provided by an electronic device according to various embodiments of the disclosure.

According to various embodiments, the electronic device 101 (e.g., the processor 120) may display a first screen 1010, as an example of a user interface for an utterance request, on the display module 160. The first screen 1010 may include identification information 1011 about the channel currently entered by the electronic device 101 and a button 1012 for utterance. To request an utterance, the user may select (e.g., touch input) the button 1012, and the electronic device 101 may transmit a floor request message to the PTT server 200. The electronic device 101 may output a notification (e.g., a beep sound) indicating that a floor grant message corresponding to the floor request message is received from the PTT server 200. Thereafter, the electronic device 101 may transmit, to the PTT server 200, media data corresponding to the voice received through the microphone, and the PTT server 200 may transmit the received media data to the electronic device corresponding to the user participating in the first channel.

Meanwhile, the electronic device 101 may identify a user input for leaving the first channel. Based on the user input, the electronic device 101 may display a second screen 1020. The second screen 1020 may include information 1021 and 2022 about at least one channel that the user of the electronic device 101 participates in. For example, although it is illustrated that the information 1021 and 1022 about at least one channel participated in includes channel identification information (e.g., name), this is merely an example, and may further include information about the user participating in the channel (e.g., user identification information, number of users, or whether the user is online), and the type is not limited. For example, upon identifying a touch input 1024 to the information 1022 about the second channel, the electronic device 101 may display a third screen 1030 for the state of entry into the second channel on the display module 160. The third screen 1030 may include identification information 1031 about the second channel currently entered by the electronic device 101 and a button 1032 for utterance. The electronic device 101 may transmit an invite request message for activating the second channel to the PTT server 200 based on entry into the second channel. The electronic device 101 may transmit an invite request message for deactivating the first channel to the PTT server 200 based on entry into the second channel. Meanwhile, the second screen 1020 may include a button 1023 for generating a new channel. Although not shown, the electronic device 101 may also display a list of users that may be invited to the new channel, based on designation of the button 1023, and a message for inviting a user selected from the user list may be transmitted to the PTT server 200.

Figure 11:
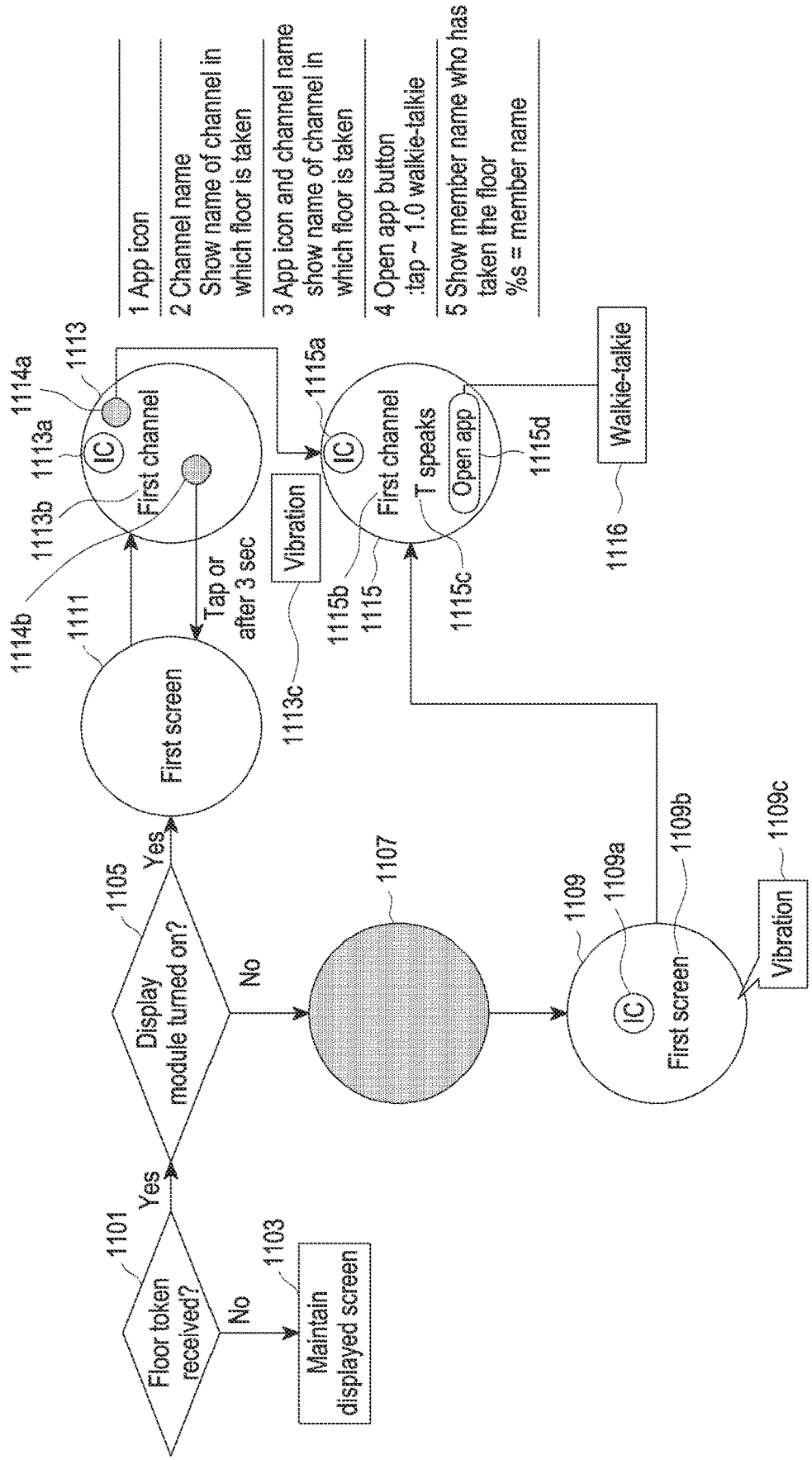
FIG. 11 is a view illustrating a user interface provided by an electronic device according to various embodiments of the disclosure.

FIG. 11 is a view illustrating a user interface provided by an electronic device according to various embodiments of the disclosure. The embodiment of FIG. 11 may be user interfaces provided when the electronic device 101 deactivates a specific channel.

According to various embodiments, in operation 1101, the electronic device 101 (e.g., the processor 120) may identify whether a floor taken message is received. If a floor taken message is not received (No in operation 1101), the electronic device 101 may maintain the displayed screen in operation 1103. If the display module 160 is off, the electronic device 101 may maintain the off-state of the display module 160. Upon receiving a floor taken message, the electronic device 101 may identify whether the display module 160 is currently off.

According to various embodiments, if the display module 160 is currently off (No in operation 1105), the electronic device 101 may turn on the off-state 1107 display module 160 and display a screen 1109 to indicate generation of media data. The screen 1109 may include an icon 1109a corresponding to the channel (e.g., the first channel) where media data is generated and channel identification information 1109b, but this is exemplary and is not limited as long as it is information associated with channel. The electronic device 101 outputs a vibration 1109c together, allowing the user to recognize the generation of media data.

According to various embodiments, if the display module 160 is currently on (Yes in 1105), the electronic device 101 may stop displaying the first screen 1111 while being currently displayed and display a screen 1113 to indicate the generation of media data. Alternatively, the electronic device 101 may display a screen 1113 (or a popup window) to indicate the generation of media data, on a partial area of the first screen 1111 being currently displayed. The screen 1113 to indicate the generation of media data may include an icon 1113a corresponding to the channel (e.g., the first channel) where media data is generated and channel identification information 1113b, but this is exemplary and is not limited as long as it is information associated with channel. The screen 1113 may be the same as, or at least partially different from, the screen 1109. The electronic device 101 outputs a vibration 1113c together, allowing the user to recognize the generation of media data.

According to various embodiments, upon identifying a first user input 1114a, the electronic device 101 may display a screen 1115 including detailed information associated with the corresponding channel. Alternatively, upon identifying a user input while displaying the screen 1109, the electronic device 101 may display a screen 1115 including detailed information associated with the corresponding channel. Upon identifying a second user input 1114b, the electronic device 101 may display the existing first screen 1111 being displayed. Alternatively, based on the elapse of a designated period (e.g., three seconds) after the screen 1113 is displayed, the electronic device 101 may display the existing first screen 1111 being displayed. The first user input 1114a and the second user input 1114b may be distinguished depending on their input positions or their input types, but the method for distinguishing them is not limited. The screen 1115 may include an icon 1115a corresponding to the first channel, identification information 1115b about the first channel, information 1115c about the user currently issuing an utterance (or to which a floor grant message has been provided), and/or a button 1115d for execution of an application for providing a PTT service. As described above, the electronic device 101 may identify information about the uttering user (or scheduled to issue an utterance) based on user identification information (e.g., IMPU) included in the floor taken message. If a designated for the button 1115d is identified, the electronic device 101 may execute an application (e.g., a walkie-talkie application) 1116 for providing a PTT service and display its execution screen. The execution screen may include information associated with the user currently issuing an utterance (e.g., the name and/or image of the uttering user) and/or a button for utterance. The electronic device 101 may activate the corresponding channel using the execution of the application 1116 for providing a PTT service as a trigger. The electronic device 101 may transmit an invite request message for activating the corresponding channel to the PTT server 200. The PTT server 200 may activate the corresponding channel of the user of the electronic device 101 of the channel. The PTT server 200 may provide media data, from another user on the corresponding channel, to the electronic device 101, and the electronic device 101 may reproduce (e.g., output in voice) the received media data. Meanwhile, although FIGS. 10 and 11 illustrate execution screens which are visual user interfaces, this is merely an example, and the method of providing the user interfaces is not limited.

According to various embodiments, an electronic device (e.g., the electronic device 101) may comprise at least one processor (e.g., the processor 120), at least one communication module circuitry (e.g., the communication module 190) operatively connected to the at least one processor, and at least one output device (e.g., at least one of the sound output module 155, the display module 160, the audio module 170, the sensor module 176, or the haptic module 179) operatively connected to the at least one processor. The at least one processor may be configured to activate a first channel for providing a push-to-talk (PTT) service and deactivate a second channel for providing the PTT service in a state in which the first channel and the second channel are generated, transmit a first message associated with the first channel including information indicating that the first channel is activated, through the at least one communication module circuitry to a PTT server configured to provide the PTT service, transmit a second message associated with the second channel including information indicating that the second channel is deactivated, through the at least one communication module circuitry to the PTT server, output first media data associated with the first channel using first part of the at least one output device, based on reception of the first media data associated with the first channel through the at least one communication module circuitry, and output a notification indicating that second media data associated with the second channel is generated using second part of the at least one output device, based on reception of a floor taken message associated with the second channel through the at least one communication module circuitry.

According to various embodiments, the at least one processor may be configured to, as at least part of activating the first channel and deactivating the second channel, activate the first channel based on a user input to designate the first channel and deactivate the second channel based on activating the first channel.

According to various embodiments, the at least one processor may be configured to, as at least part of activating the first channel based on the user input to designate the first channel and deactivating the second channel based on activating the first channel, provide a first user interface capable of selecting any one of the first channel and the second channel, and activate the first channel based on receiving the user input to designate the first channel through the user interface and deactivate the second channel based on activating the first channel. The at least one processor may be further configured to provide a second user interface including information associated with the first channel. The first user interface may include a visual element for visually identifying a currently activated channel.

According to various embodiments, the at least one processor may be configured to, as at least part of activating the first channel and deactivating the second channel, activate the first channel based on transmitting a message for generating the first channel to the PTT server through the at least one communication module circuitry, and deactivate the second channel based on activating the first channel.

According to various embodiments, the at least one processor may be configured to, as at least part of activating the first channel and deactivating the second channel, receive a message to invite to participate in the first channel from the PTT server through the at least one communication module circuitry, and activate the first channel based on transmitting a message to accept the participation in the first channel to the PTT server in response to the message to invite to participate in the first channel through the at least one communication module circuitry and deactivate the second channel based on activating the first channel.

According to various embodiments, the at least one processor may be configured to, as at least part of activating the first channel and deactivating the second channel, output another notification indicating that media data is generated from the first channel before the first channel is activated using the second part of the at least one output device, through the at least one communication module circuitry, and activate the first channel based on a user input to enter the first channel in response to the other notification and deactivate the second channel based on activating the first channel.

According to various embodiments, the at least one processor may be further configured to provide a third user interface including information associated with the first channel, based on a user input to enter the first channel.

According to various embodiments, the first message may be an SIP-based invite request message that includes an attribute of "sendrecv" as information indicating that the first channel is activated.

According to various embodiments, the second message may be an SIP-based invite request message that includes an attribute of "inactive" as information indicating that the second channel is deactivated.

According to various embodiments, the at least one processor may be configured to, as at least part of outputting the notification indicating that the second media data associated with the second channel is generated using the second part of the at least one output device, output at least one of a first notification including information associated with the second channel and/or information associated with a user providing the second media data or a second notification independent from the information associated with the second channel and/or the information associated with the user providing the second media data, using the second part of the at least one output device.

According to various embodiments, a method for operating a server to provide a push-to-talk (PTT) service may comprise receiving a first message associated with a first channel for providing the PTT service, including information indicating that the first channel is activated, from a first electronic device associated with the first channel and a second channel for providing the PTT service, receiving a second message associated with the second channel including information indicating that the second channel is deactivated, from the first electronic device, receiving a floor request message for the second channel, from a second electronic device associated with the second channel, transmitting a floor grant message corresponding to the floor request message, to the second electronic device, transmitting a floor taken message corresponding to the floor request message, to the first electronic device, and refraining from transmitting media data received from the second electronic device to the first electronic device, based on deactivating the second channel by the first electronic device.

According to various embodiments, the method for operating the same may further comprise transmitting the media data received from the second electronic device, to at least one other electronic device corresponding to at least one other participant activating the second channel among participants of the second channel.

According to various embodiments, the first message may be an SIP-based invite request message that includes an attribute of "sendrecv" as information indicating that the first channel is activated.

According to various embodiments, the method for operating the electronic device may further comprise receiving an RTP- or RTCP-based dummy packet from the first electronic device in a state in which the first channel is activated, according to the attribute of "sendrecv," and transmitting an RTP- or RTCP-based dummy ack packet in response to receiving the dummy packet.

According to various embodiments, the second message may be an SIP-based invite request message that includes an attribute of "inactive" as information indicating that the second channel is deactivated.

According to various embodiments, refraining from transmitting the media data received from the second electronic device to the first electronic device, based on deactivating the second channel by the first electronic device may be refraining from transmitting the media data received from the first electronic device to the first electronic device, based on transmitting the floor taken message while transmitting, to the first electronic device, other media data from a channel other than the second channel.

According to various embodiments, refraining from transmitting the media data received from the second electronic device to the first electronic device, based on deactivating the second channel by the first electronic device may be refraining from transmitting the media data received from the second electronic device to the first electronic device, based on deactivating the second channel by the first electronic device, independently from whether other media data from a channel other than the second channel is transmitted to the first electronic device.

According to various embodiments, a method for operating an electronic device may comprise activating a first channel for providing a push-to-talk (PTT) service and deactivating a second channel for providing the PTT service in a state in which the first channel and the second channel are generated, transmitting a first message associated with the first channel including information indicating that the first channel is activated to a PTT server configured to provide the PTT service, transmitting a second message associated with the second channel including information indicating that the second channel is deactivated, to the PTT server, outputting first media data associated with the first channel using first part of at least one output device, based on reception of the first media data associated with the first channel, and outputting a notification indicating that second media data associated with the second channel is generated using second part of the at least one output device, based on reception of a floor taken message associated with the second channel.

According to various embodiments, the first message may be an SIP-based invite request message that includes an attribute of "sendrecv" as information indicating that the first channel is activated.

According to various embodiments, the second message may be an SIP-based invite request message that includes an attribute of "inactive" as information indicating that the second channel is deactivated.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
at least one communication module circuitry;
at least one output device;
memory, comprising one or more storage media, storing instructions; and
at least one processor communicatively coupled to the at least one communication module circuitry, the at least one output device, and the memory,
wherein the instructions, when executed by the at least one processor individually or collectively, cause the electronic device to:
transmit, to a push-to-talk (PTT) server, a first message requiring generation and activation of a first channel for providing a push-to-talk (PTT) service,
transmit, to the PTT server, a second message requiring generation and activation of a second channel for providing the PTT service,
based on a user input for deactivating the second channel, transmit to the PTT server, an invite request message including information associated with deactivation of the second channel,
receive, from the PTT server, a third message indicating that media data associated with the first channel is generated,
based on reception of first media data associated with the first channel after receiving the third message, output the first media data,
while the second channel is deactivated by the invite request message, receive, from the PTT server, a floor taken message indicating that media data associated with the second channel is generated, and
based on reception of the floor taken message while the second channel is deactivated by the invite request message, display a screen including a notification indicating that media data associated with the second channel is generated.

2. The electronic device of claim 1, wherein the instructions, when executed by the at least one processor individually or collectively, further cause the electronic device to:
based on a user input to select the first channel, determine to activate the first channel and deactivate the second channel.

3. The electronic device of claim 2, wherein the instructions, when executed by the at least one processor individually or collectively, further cause the electronic device to:
provide a first user interface capable of selecting any one of the first channel and the second channel,
receive the user input to select the first channel through the first user interface, and
provide a second user interface including information associated with the first channel based on the first channel is selected, and
wherein the first user interface includes a visual element for visually identifying at least one currently activated channel.

4. The electronic device of claim 1, wherein the instructions, when executed by the at least one processor individually or collectively, further cause the electronic device to:
receive a message to invite to participate in the first channel from the PTT server through the at least one communication module circuitry before the first channel is activated, and
in response to the message to invite to participate in the first channel, determine to accept to participate in the first channel.

5. The electronic device of claim 1, wherein the instructions, when executed by the at least one processor individually or collectively, further cause the electronic device to:

output a first notification indicating that media data associated with the first channel is generated before the first channel is activated, and in response to receiving a user input to enter the first channel after outputting the first notification, determine to activate the first channel and deactivate the second channel.

6. The electronic device of claim 1, wherein the instructions, when executed by the at least one processor individually or collectively, further cause the electronic device to provide a third user interface including information associated with the first channel, based on a user input to enter the first channel.

7. The electronic device of claim 1, wherein the first message is a session initiation protocol (SIP)-based invite request message that includes an attribute of "sendrecv" as information indicating that the first channel is activated.

8. The electronic device of claim 1, wherein the invite request message is an SIP-based invite request message that includes an attribute of "inactive" as information indicating that the second channel is deactivated.

9. The electronic device of claim 1, wherein the notification includes information associated with the second channel or a user providing the media data associated with the second channel.

10. The electronic device of claim 1,
wherein the notification comprises information about the second channel, and
wherein the instructions, when executed by the one or more processors individually or collectively, cause the electronic device to:
based on receiving a user input to select the information about the second channel through the screen, transmit, to the PTT server, an invite request message including information associated with activation of the second channel.

11. The electronic device of claim 1, wherein the invite request message causes the PTT server to refrain from transmitting, to the electronic device, media data received from an external electronic device participating in the second channel.

12. A method for operating an electronic device, the method comprising:
transmitting, to a push-to-talk (PTT) server, a first message requiring generation and activation of a first channel for providing a push-to-talk (PTT) service;
transmitting, to the PTT server, a second message requiring generation and activation of a second channel for providing the PTT service;
based on a user input for deactivating the second channel, transmitting to the PTT server, an invite request message including information associated with deactivation of the second channel;
receiving, from the PTT server, a third message indicating that media data associated with the first channel being generated;
based on reception of first media data associated with the first channel after receiving the third message, outputting the first media data;
while the second channel is deactivated by the invite request message, receiving, from the PTT server, a floor taken message indicating that media data associated with the second channel is generated; and
based on reception of the floor taken message while the second channel is deactivated by the invite request message, displaying a screen including a notification indicating that media data associated with the second channel is generated.

13. The method of claim 12, wherein the first message is a session initiation protocol (SIP)-based invite request message that includes an attribute of "sendrecv" as information indicating that the first channel is activated.

14. The method of claim 12, wherein the invite request message is an SIP-based invite request message that includes an attribute of "inactive" as information indicating that the second channel is deactivated.

15. The method claim 12,
wherein the notification comprises information about the second channel, and
wherein the method further comprises:
based on receiving a user input to select the information about the second channel through the screen, transmitting, to the PTT server, an invite request message including information associated with activation of the second channel.

16. The method of claim 12, wherein the invite request message causes the PTT server to refrain from transmitting, to the electronic device, media data received from an external electronic device participating in the second channel.

\* \* \* \* \*